US012549975B2

(12) United States Patent
Ryu et al.

(10) Patent No.: US 12,549,975 B2
(45) Date of Patent: Feb. 10, 2026

(54) USER EQUIPMENT (UE) MOBILITY BETWEEN A NON-TERRESTRIAL NETWORK (NTN) AND A TERRESTRIAL NETWORK (TN)

(71) Applicant: QUALCOMM Incorporated, San Diego, CA (US)

(72) Inventors: Jae Ho Ryu, San Diego, CA (US); Changhwan Park, San Diego, CA (US); Liangping Ma, San Diego, CA (US); Bharat Shrestha, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 719 days.

(21) Appl. No.: 17/838,052

(22) Filed: Jun. 10, 2022

(65) Prior Publication Data
US 2023/0403585 A1 Dec. 14, 2023

(51) Int. Cl.
H04W 24/08 (2009.01)
(52) U.S. Cl.
CPC .................. *H04W 24/08* (2013.01)
(58) Field of Classification Search
CPC . H04W 24/08; H04W 24/10; H04W 56/0015; H04W 36/0088; H04W 36/0094;
(Continued)

(56) References Cited

U.S. PATENT DOCUMENTS

2022/0046490 A1  2/2022  Tripathi et al.
2022/0232465 A1* 7/2022  Tsuda .................... H04W 76/10
(Continued)

FOREIGN PATENT DOCUMENTS

WO   WO-2022029720 A1   2/2022
WO   WO-2022067718 A1   4/2022

OTHER PUBLICATIONS

International Search Report and Written Opinion—PCT/US2023/067217—ISA/EPO—Aug. 7, 2023.
(Continued)

*Primary Examiner* — Kevin T Bates
*Assistant Examiner* — Hector Reyes
(74) *Attorney, Agent, or Firm* — Holland & Hart LLP/ QUALCOMM Incorporated

(57) ABSTRACT

Methods, systems, and devices for wireless communications are described. In some systems, a user equipment (UE) may support mobility between a non-terrestrial network (NTN) cell and a terrestrial network (TN) cell. If the UE is connected to an NTN cell, the UE may determine timing for a neighboring TN cell using a reference timestamp. A first network entity supporting the NTN cell may request the reference timestamp from a second network entity supporting the TN cell. The second network entity may output the timestamp in response to the request. The first network entity may obtain the timestamp and output an indication of the timestamp to the UE in a measurement gap configuration. The UE may use the reference timestamp to determine timing for a measurement gap and may monitor for a signal (e.g., a synchronization signal) from the second network entity supporting the TN cell during the measurement gap.

35 Claims, 16 Drawing Sheets

(58) Field of Classification Search
CPC .. H04W 84/06; H04B 7/1851; H04B 7/18545
See application file for complete search history.

(56) References Cited

U.S. PATENT DOCUMENTS

| | | | |
|---|---|---|---|
| 2023/0284060 A1* | 9/2023 | Euler | H04W 24/10 370/329 |
| 2024/0080737 A1* | 3/2024 | Park | H04W 36/322 |
| 2024/0349155 A1* | 10/2024 | Stanczak | H04W 36/32 |

OTHER PUBLICATIONS

Qualcomm Incorporated: "Measurement Procedure Requirements", 3GPP TSG-RAN WG4 Meeting # 101-bis-e, R4-2200422, 3rd Generation Partnership Project, Mobile Competence Centre, 650, Route Des Lucioles, F-06921 Sophia-Antipolis Cedex, France, vol. RAN WG4, No. Electronic Meeting, Jan. 17-25, 2022, Jan. 10, 2022, 2 Pages, XP052094830.

3GPP: "3rd Generation Partnership Project, Technical Specification Group Radio Access Network, NR, NR and NG-RAN Overall Description, Stage 2 (Release 17)", 3GPP TS 38.300 V17.0.0, Mar. 2022, 3GPP Organizational Partners, Sophia Antipolis Valbonne, France, 11 pages, Section 16.14.3.2.1.

* cited by examiner

USER EQUIPMENT (UE) MOBILITY BETWEEN A NON-TERRESTRIAL NETWORK (NTN) AND A TERRESTRIAL NETWORK (TN)

INTRODUCTION

The following relates to wireless communications, including user equipment (UE) mobility between cells of different types.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as UEs.

SUMMARY

A method for wireless communications at a UE is described. The method may include receiving, from a first network entity associated with a first cell type operating via a first carrier frequency, a first signal including an indication of a reference timestamp for a measurement gap, the reference timestamp corresponding to a second network entity associated with a second cell type operating via a second carrier frequency. In some examples, the method may include monitoring, as part of a cell measurement procedure and during the measurement gap, the second carrier frequency for a second signal from the second network entity, the measurement gap being based on the reference timestamp.

An apparatus for wireless communications at a UE is described. The apparatus may include a processor and memory coupled with the processor. The processor may be configured to receive, from a first network entity associated with a first cell type operating via a first carrier frequency, a first signal including an indication of a reference timestamp for a measurement gap, the reference timestamp corresponding to a second network entity associated with a second cell type operating via a second carrier frequency. In some examples, the processor may be configured to monitor, as part of a cell measurement procedure and during the measurement gap, the second carrier frequency for a second signal from the second network entity, the measurement gap being based on the reference timestamp.

Another apparatus for wireless communications at a UE is described. The apparatus may include means for receiving, from a first network entity associated with a first cell type operating via a first carrier frequency, a first signal including an indication of a reference timestamp for a measurement gap, the reference timestamp corresponding to a second network entity associated with a second cell type operating via a second carrier frequency. In some examples, the apparatus may include means for monitoring, as part of a cell measurement procedure and during the measurement gap, the second carrier frequency for a second signal from the second network entity, the measurement gap being based on the reference timestamp.

A non-transitory computer-readable medium storing code for wireless communications at a UE is described. The code may include instructions executable by a processor to receive, from a first network entity associated with a first cell type operating via a first carrier frequency, a first signal including an indication of a reference timestamp for a measurement gap, the reference timestamp corresponding to a second network entity associated with a second cell type operating via a second carrier frequency. In some examples, the code may include instructions executable by a processor to monitor, as part of a cell measurement procedure and during the measurement gap, the second carrier frequency for a second signal from the second network entity, the measurement gap being based on the reference timestamp.

Some examples of the method, apparatuses, and non-transitory computer-readable medium described herein may further include operations, features, means, or instructions for receiving, from the second network entity, the second signal based on the monitored second carrier frequency. In some examples, the method, apparatuses, and non-transitory computer-readable medium described herein may further include operations, features, means, or instructions for switching a connection from the first network entity to the second network entity based on one or more measurements of the second signal.

In some examples of the method, apparatuses, and non-transitory computer-readable medium described herein, the cell measurement procedure includes a first cell measurement procedure and the method, apparatuses, and non-transitory computer-readable medium may include further operations, features, means, or instructions for receiving, from the second network entity, a third signal including a first priority value for the first carrier frequency that corresponds to the first cell type. In some examples, the first priority value is less than a second priority value corresponding to the second cell type. In some examples, the method, apparatuses, and non-transitory computer-readable medium may include further operations, features, means, or instructions for refraining from a second cell measurement procedure for the first carrier frequency based on the first priority value.

Some examples of the method, apparatuses, and non-transitory computer-readable medium described herein may further include operations, features, means, or instructions for refraining from a second cell measurement procedure for the first carrier frequency based on a first priority value for the first carrier frequency, the first priority value based on the first carrier frequency corresponding to the first cell type. In some examples, the first priority value is less than a second priority value corresponding to the second cell type.

In some examples of the method, apparatuses, and non-transitory computer-readable medium described herein, the first cell type corresponds to a first priority value. In some examples, the method, apparatuses, and non-transitory computer-readable medium may include further operations, features, means, or instructions for receiving, from the first network entity, a third signal including a second priority value for the second carrier frequency based on the second carrier frequency corresponding to the second cell type, the second priority value being greater than the first priority value corresponding to the first cell type, and the monitoring of the second carrier frequency being based on the second priority value.

Some examples of the method, apparatuses, and non-transitory computer-readable medium described herein may further include operations, features, means, or instructions for operating based on a connected mode mobility, the second priority value for the second carrier frequency associated with a configuration for the connected mode mobility.

In some examples, the first cell type corresponds to a first priority value. Some examples of the method, apparatuses, and non-transitory computer-readable medium configured to monitor the second carrier frequency may include operations, features, means, or instructions for monitoring the second carrier frequency based on a second priority value for the second carrier frequency, the second priority value based on the second carrier frequency corresponding to the second cell type. In some examples, the second priority value is greater than the first priority value corresponding to the first cell type.

Some examples of the method, apparatuses, and non-transitory computer-readable medium described herein may further include operations, features, means, or instructions for receiving, from the second network entity, a synchronization signal block (SSB) including a second timestamp corresponding to the second network entity. In some examples, the method, apparatuses, and non-transitory computer-readable medium described herein may further include operations, features, means, or instructions for monitoring, as part of a second cell measurement procedure, for a third signal from the second network entity during the measurement gap based on the second timestamp.

Some examples of the method, apparatuses, and non-transitory computer-readable medium described herein may further include operations, features, means, or instructions for transmitting, to the first network entity, a third signal indicating location information for the UE, the first signal indicating the reference timestamp corresponding to the second network entity based on the location information for the UE.

In some examples of the method, apparatuses, and non-transitory computer-readable medium described herein, the reference timestamp includes a universal time coordinated (UTC) timestamp, a portion of the UTC timestamp, a global navigation satellite system (GNSS) timestamp, a portion of the GNSS timestamp, or a combination thereof.

In some examples of the method, apparatuses, and non-transitory computer-readable medium described herein, the reference timestamp indicates a system frame number (SFN) with a value of zero for the second network entity.

In some examples of the method, apparatuses, and non-transitory computer-readable medium described herein, the first signal further indicates an offset in a time domain for the measurement gap, a periodicity for the measurement gap, a duration for the measurement gap, or a combination thereof. In some examples, monitoring the second carrier frequency is further based on the offset, the periodicity, the duration, or a combination thereof.

Some examples of the method, apparatuses, and non-transitory computer-readable medium described herein may further include operations, features, means, or instructions for transmitting, to the first network entity, a third signal indicating a slot-level offset for the measurement gap based on the measurement gap that is based on the reference timestamp corresponding to the second network entity crossing a downlink slot boundary of the first network entity.

Some examples of the method, apparatuses, and non-transitory computer-readable medium described herein may further include operations, features, means, or instructions for receiving, from the first network entity, a third signal indicating location information and distance thresholds for a set of multiple cells associated with the second cell type, the third signal indicating at least a respective location and a respective distance threshold of the second network entity. In some examples, the method, apparatuses, and non-transitory computer-readable medium described herein may further include operations, features, means, or instructions for monitoring for the second signal from the second network entity based on the UE being within the respective distance threshold of the respective location of the second network entity.

In some examples of the method, apparatuses, and non-transitory computer-readable medium described herein, the first cell type includes a non-terrestrial network (NTN) cell type and the second cell type includes a terrestrial network (TN) cell type.

A method for wireless communications at a first network entity is described. The method may include outputting a first signal including a request for a reference timestamp corresponding to a second network entity, the first network entity being associated with a first cell type operating via a first carrier frequency, and the second network entity being associated with a second cell type operating via a second carrier frequency. In some examples, the method may include obtaining a second signal indicating the reference timestamp corresponding to the second network entity based on the request and outputting a third signal indicating the reference timestamp corresponding to the second network entity, the third signal configuring a measurement gap for a UE.

An apparatus for wireless communications at a first network entity is described. The apparatus may include a processor and memory coupled with the processor. The processor may be configured to output a first signal including a request for a reference timestamp corresponding to a second network entity, the first network entity being associated with a first cell type operating via a first carrier frequency, and the second network entity being associated with a second cell type operating via a second carrier frequency. In some examples, the processor may be configured to obtain a second signal indicating the reference timestamp corresponding to the second network entity based on the request and output a third signal indicating the reference timestamp corresponding to the second network entity, the third signal configuring a measurement gap for a UE.

Another apparatus for wireless communications at a first network entity is described. The apparatus may include means for outputting a first signal including a request for a reference timestamp corresponding to a second network entity, the first network entity being associated with a first cell type operating via a first carrier frequency, and the second network entity being associated with a second cell type operating via a second carrier frequency. In some examples, the apparatus may include means for obtaining a second signal indicating the reference timestamp corresponding to the second network entity based on the request and means for outputting a third signal indicating the reference timestamp corresponding to the second network entity, the third signal configuring a measurement gap for a UE.

A non-transitory computer-readable medium storing code for wireless communications at a first network entity is described. The code may include instructions executable by a processor to output a first signal including a request for a reference timestamp corresponding to a second network entity, the first network entity being associated with a first cell type operating via a first carrier frequency, and the second network entity being associated with a second cell type operating via a second carrier frequency. In some examples, the code may include instructions executable by a processor to obtain a second signal indicating the reference timestamp corresponding to the second network entity based on the request and output a third signal indicating the reference timestamp corresponding to the second network entity, the third signal configuring a measurement gap for a UE.

Some examples of the method, apparatuses, and non-transitory computer-readable medium described herein may further include operations, features, means, or instructions for obtaining a fourth signal indicating first location information for the UE. In some examples, the third signal is based on the first location information for the UE and second location information for the second network entity.

Some examples of the method, apparatuses, and non-transitory computer-readable medium described herein may further include operations, features, means, or instructions for outputting a fourth signal indicating location information and distance thresholds for a set of multiple cells associated with the second cell type, the fourth signal indicating at least a location and a distance threshold of the second network entity.

Some examples of the method, apparatuses, and non-transitory computer-readable medium described herein may further include operations, features, means, or instructions for obtaining an additional signal indicating an additional reference timestamp corresponding to the second network entity based on a periodicity.

In some examples of the method, apparatuses, and non-transitory computer-readable medium described herein, the first cell type corresponds to a first priority value. In some examples, the method, apparatuses, and non-transitory computer-readable medium may include further operations, features, means, or instructions for outputting a fourth signal including a second priority value for the second carrier frequency associated with the second network entity based on the second carrier frequency corresponding to the second cell type. In some examples, the second priority value is greater than the first priority value corresponding to the first cell type.

In some examples of the method, apparatuses, and non-transitory computer-readable medium described herein, the reference timestamp includes a UTC timestamp, a portion of the UTC timestamp, a GNSS timestamp, a portion of the GNSS timestamp, or a combination thereof.

In some examples of the method, apparatuses, and non-transitory computer-readable medium described herein, the reference timestamp indicates an SFN with a value of zero for the second network entity.

In some examples of the method, apparatuses, and non-transitory computer-readable medium described herein, the first cell type includes an NTN cell type and the second cell type includes a TN cell type.

A method for wireless communications at a second network entity is described. The method may include obtaining a first signal including a request for a reference timestamp corresponding to the second network entity, the request being associated with a first network entity, the first network entity being associated with a first cell type operating via a first carrier frequency, and the second network entity being associated with a second cell type operating via a second carrier frequency. In some examples, the method may include outputting a second signal indicating the reference timestamp corresponding to the second network entity based on the request. In some examples, the method may include outputting a third signal during a measurement gap, the measurement gap being based on the reference timestamp.

An apparatus for wireless communications at a second network entity is described. The apparatus may include a processor and memory coupled with the processor. The processor may be configured to obtain a first signal including a request for a reference timestamp corresponding to the second network entity, the request being associated with a first network entity, the first network entity being associated with a first cell type operating via a first carrier frequency, and the second network entity being associated with a second cell type operating via a second carrier frequency. In some examples, the processor may be configured to output a second signal indicating the reference timestamp corresponding to the second network entity based on the request. In some examples, the processor may be configured to output a third signal during a measurement gap, the measurement gap being based on the reference timestamp.

Another apparatus for wireless communications at a second network entity is described. The apparatus may include means for obtaining a first signal including a request for a reference timestamp corresponding to the second network entity, the request being associated with a first network entity, the first network entity being associated with a first cell type operating via a first carrier frequency, and the second network entity being associated with a second cell type operating via a second carrier frequency. In some examples, the apparatus may include means for outputting a second signal indicating the reference timestamp corresponding to the second network entity based on the request. In some examples, the apparatus may include means for outputting a third signal during a measurement gap, the measurement gap being based on the reference timestamp.

A non-transitory computer-readable medium storing code for wireless communications at a second network entity is described. The code may include instructions executable by a processor to obtain a first signal including a request for a reference timestamp corresponding to the second network entity, the request being associated with a first network entity, the first network entity being associated with a first cell type operating via a first carrier frequency, and the second network entity being associated with a second cell type operating via a second carrier frequency. In some examples, the code may include instructions executable by a processor to output a second signal indicating the reference timestamp corresponding to the second network entity based on the request. In some examples, the code may include instructions executable by a processor to output a third signal during a measurement gap, the measurement gap being based on the reference timestamp.

Some examples of the method, apparatuses, and non-transitory computer-readable medium described herein may further include operations, features, means, or instructions for establishing a connection with a UE based on the third signal.

Some examples of the method, apparatuses, and non-transitory computer-readable medium described herein may further include operations, features, means, or instructions for outputting an SSB including a second timestamp corresponding to the second network entity.

Some examples of the method, apparatuses, and non-transitory computer-readable medium described herein may further include operations, features, means, or instructions for outputting an additional signal indicating an additional reference timestamp corresponding to the second network entity based on a periodicity.

Some examples of the method, apparatuses, and non-transitory computer-readable medium described herein may further include operations, features, means, or instructions for outputting a fourth signal including a first priority value for the first carrier frequency corresponding to the first cell type, the first priority value being less than a second priority value corresponding to the second cell type.

In some examples of the method, apparatuses, and non-transitory computer-readable medium described herein, the first cell type includes an NTN cell type and the second cell type includes a TN cell type.

DETAILED DESCRIPTION

Figure 1:
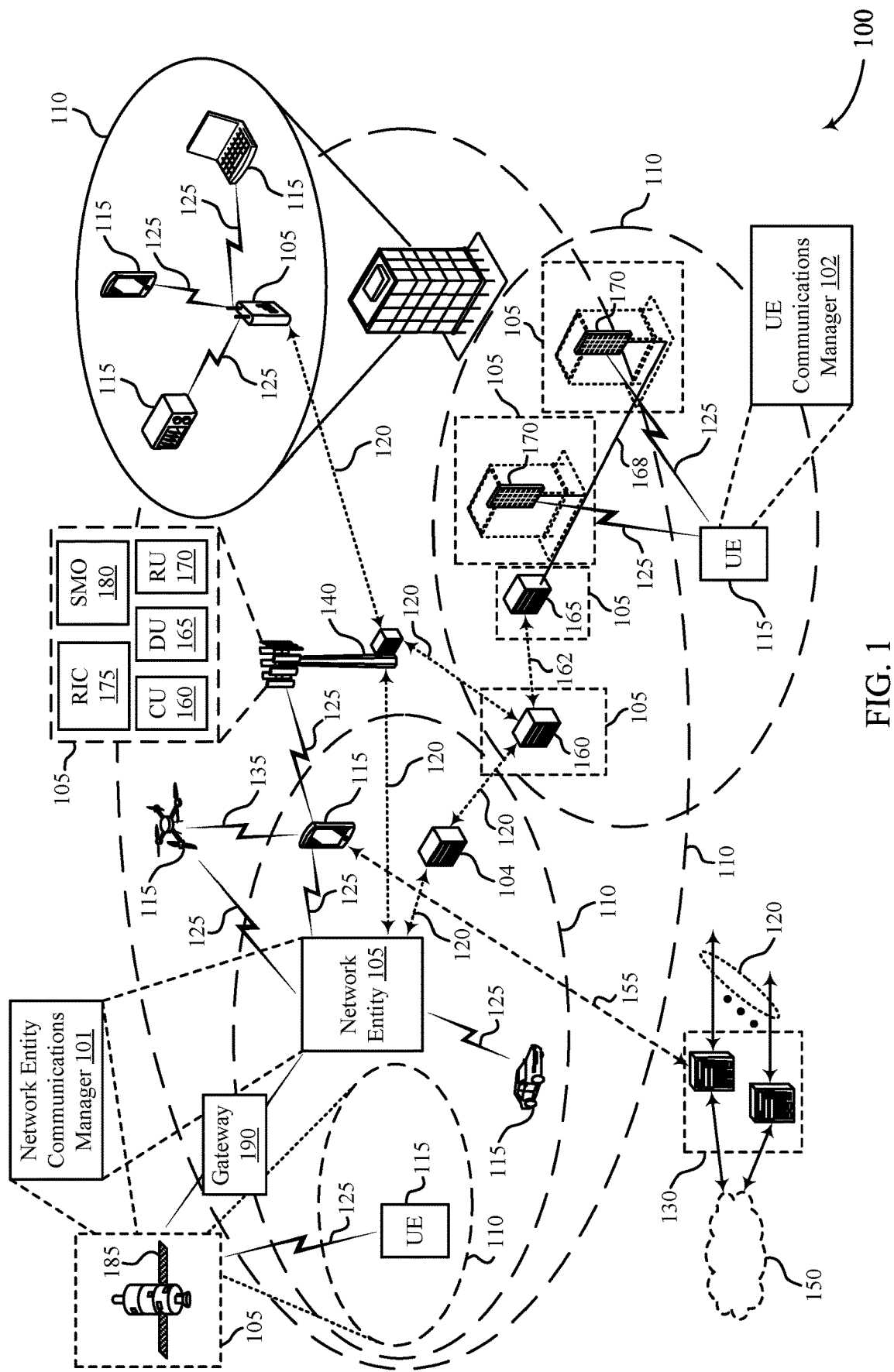
FIG. 1 illustrates an example of a wireless communications system that supports UE mobility between an NTN and a TN in accordance with one or more aspects of the present disclosure.

In some wireless communications systems, a UE may connect to a wireless network via a cell of an NTN. As described herein, a cell may refer to a combination of frequency resources (e.g., carrier frequencies) and spatial resources (e.g., geographic zones) used for wireless communications. An NTN may refer to a wireless communications system that includes non-terrestrial communication devices such as satellites, zeppelins, dirigibles, balloons, or drones, among other examples. An NTN cell may be supported by a non-terrestrial communication device (e.g., a non-terrestrial network entity) such as a satellite, a zeppelin, a dirigible, a balloon, a drone, unmanned aerial vehicle (UAV), or another aerial device or device capable of air to ground (ATG) communications. Additionally, or alternatively, the UE may connect to the wireless network via a cell of a TN. A TN may refer to a wireless communications system that includes terrestrial communication devices such as base stations, access points, or internet of things (IoT) devices, among other examples. A TN cell may be supported by a terrestrial communication device (e.g., a terrestrial network entity) such as a base station, an access point, an IoT device, or another terrestrial device.

Some UEs may have the capability to switch between NTN and TN connections. However, a TN cell (e.g., a cell supported by a terrestrial network entity) may provide improved wireless communications (e.g., greater signaling reliability, lower signaling latency, or both) as compared to an NTN cell (e.g., a cell supported by a non-terrestrial network entity). For example, a terrestrial network entity providing coverage for a TN cell may be stationary and relatively closer to a UE than a non-terrestrial network entity providing coverage for an NTN cell and in some cases, the non-terrestrial network entity may be moving. Communications between the UE and the terrestrial network entity may experience relatively lower propagation delays, interference, and signal attenuation as compared to communications between the UE and a non-terrestrial network entity. Accordingly, the UE may improve wireless communication reliability and latency by connecting to the network via the terrestrial network entity, as compared to via the non-terrestrial network entity. If the UE is located in both TN and NTN cell coverage, the UE may prioritize establishing or maintaining a connection with the terrestrial network entity to support improved communication reliability and latency between the UE and the network (e.g., via the terrestrial network entity).

Aspects of the present disclosure may support techniques for managing and prioritizing TN connections if mobility between TN and NTN cells is supported. To support cell mobility, the UE may perform a cell measurement procedure. A cell measurement procedure may involve the UE monitoring a carrier frequency associated with a neighboring cell for signaling (e.g., a synchronization signal, reference signal) from the neighboring cell. The UE may monitor for the signaling within a measurement gap, which may be a time window during which the UE may tune a radio frequency (RF) module of the UE to the carrier frequency associated with the neighboring cell. If the UE detects and receives signaling from the neighboring cell based on the monitoring, the UE may measure one or more signal metrics (e.g., signal strength, signal quality) to determine whether to switch a network connection to the neighboring cell. To support accurate timing for a measurement gap configuration for NTN-to-TN mobility, a non-terrestrial network entity may use an absolute timing for a terrestrial network entity (e.g., as opposed to using a measurement gap offset between the timing of the non-terrestrial network entity and the timing of the terrestrial network entity). The absolute timing for the terrestrial network entity may mitigate any potential timing misalignment at the UE between the measurement gap configuration and the synchronization signaling by the terrestrial network entity, improving the reliability of cell measurements and synchronization signaling.

For example, the non-terrestrial network entity may request a reference timestamp (e.g., indicating an absolute timing) from the terrestrial network entity. The terrestrial network entity may transmit the reference timestamp in response to the request. The non-terrestrial network entity may transmit, to the UE, an indication of the reference timestamp for the terrestrial network entity, and the UE may determine a timing for a measurement gap using the reference timestamp. For example, the UE may monitor, as part of a cell measurement procedure, for a synchronization signal from the terrestrial network entity during the measurement gap based on the reference timestamp. If the UE detects the synchronization signal from the terrestrial network entity, in some examples, the UE may trigger NTN-to-TN mobility. The UE may switch a connection to the network from using the non-terrestrial network entity to using the terrestrial network entity, improving signaling reliability and latency based on switching to the TN connection. Additionally, or alternatively, using the reference timestamp instead of a timing offset value between the non-terrestrial network entity and the terrestrial network entity (which may frequently change with the movement of the non-terrestrial network entity), the wireless communications system may reduce signaling overhead associated with configuring measurement gaps. Additionally, or alternatively, the UE, the network, or both may prioritize TN connections over NTN connections (e.g., using priority values for different frequency ranges corresponding to different cell types). By prioritizing TN connections, the wireless communications system may increase an amount of time that the UE is connected to the network via a TN cell, which may be more reliable and may have less latency relative to an NTN cell.

Aspects of the disclosure are initially described in the context of wireless communications systems. Aspects of the disclosure are further illustrated by and described with reference to process flows, apparatus diagrams, system diagrams, and flowcharts that relate to UE mobility between an NTN and a TN.

FIG. 1 illustrates an example of a wireless communications system 100 that supports UE mobility between an NTN and a TN in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support UE mobility between an NTN and a TN as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, a node, which may be referred to as a node, a network node, a network entity, or a wireless node, may be a base station 140 (e.g., any base station described herein), a UE 115 (e.g., any UE described herein), a network controller, an apparatus, a device, a computing system, one or more components, or another suitable processing entity configured to perform any of the techniques described herein. For example, a network node may be a UE 115. As another example, a network node may be a base station 140. As another example, a first network node may be configured to communicate with a second network node or a third network node. In one aspect of this example, the first network node may be a UE 115, the second network node may be a base station 140, and the third network node may be a UE 115. In another aspect of this example, the first network node may be a UE 115, the second network node may be a base station 140, and the third network node may be a base station 140. In yet other aspects of this example, the first, second, and third network nodes may be different relative to these examples.

Similarly, reference to a UE 115, a base station 140, apparatus, device, computing system, or the like may include disclosure of the UE 115, base station 140, apparatus, device, computing system, or the like being a network node. For example, disclosure that a UE 115 is configured to receive information from a base station 140 also discloses that a first network node is configured to receive information from a second network node. Consistent with this disclosure, once a specific example is broadened in accordance with this disclosure (e.g., a UE 115 is configured to receive information from a base station 140 also discloses that a first network node is configured to receive information from a second network node), the broader example of the narrower example may be interpreted in the reverse, but in a broad open-ended way. In the example above where a UE 115 being configured to receive information from a base station 140 also discloses that a first network node being configured to receive information from a second network node, the first network node may refer to a first UE 115, a first base station 140, a first apparatus, a first device, a first computing system, a first one or more components, a first processing entity, or the like configured to receive the information; and the second network node may refer to a second UE 115, a second base station 140, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

A network entity communications manager 101 may manage communications between a network entity 105 and other devices in the wireless communications system 100. In a similar manner, a UE communications manager 102 may manage communications between a UE 115 and other devices in the wireless communications system 100. As described herein, a network entity 105 may refer to a terrestrial communication device (such as a base station 140) or a non-terrestrial communication device (such as a satellite 185). A non-terrestrial network entity 105 may be connected to a terrestrial network entity 105 via a gateway 190. In some examples, a non-terrestrial network entity 105 may correspond to a first cell type (e.g., an NTN cell type), and a terrestrial network entity 105 may correspond to a second cell type (e.g., a TN cell type) different from the first cell type.

Some wireless communications systems 100 may support mobility between an NTN cell and a TN cell, which may be referred to as NTN-TN mobility. For example, a UE 115 connected to the network via a non-terrestrial network entity 105 may switch the connection to connect to the network via a terrestrial network entity 105. This process may be referred to as NTN-to-TN mobility. Similarly, a UE 115 connected to the network via a terrestrial network entity 105 may switch the connection to connect to the network via a non-terrestrial network entity 105. This process may be referred to as TN-to-NTN mobility. In some cases, to support NTN-TN mobility (e.g., supporting both NTN-to-TN mobility and TN-to-NTN mobility), a UE 115 may be an example of a dual mode UE with both NTN capability and TN capability.

In some examples, a TN cell (e.g., a cell supported by a terrestrial network entity 105, which may include a base station 140) may provide improved wireless service (e.g., greater signaling reliability, lower signaling latency, or both) as compared to an NTN cell (e.g., a cell supported by a non-terrestrial network entity 105, which may include a satellite 185). For example, because a terrestrial network entity 105 providing coverage for a TN cell may be stationary and relatively closer to a UE 115 than a non-terrestrial network entity 105 providing coverage for an NTN cell, the UE 115 may improve wireless communication reliability and latency by connecting to the network via the terrestrial network entity 105 (as compared to via the non-terrestrial network entity 105). Accordingly, if the UE 115 is located in both TN and NTN cell coverage, the UE 115 may prioritize establishing a connection with the terrestrial network entity 105 to support improved communication reliability and latency between the UE 115 and the network (e.g., via the terrestrial network entity 105).

A UE 115 (e.g., a dual mode UE) may trigger NTN-to-TN mobility if the UE 115 moves from NTN-only coverage to NTN and TN coverage. For example, to prioritize a TN connection over an NTN connection (e.g., for improved communication reliability and latency), the UE 115 may switch to a TN connection if the UE 115 is located where both TN and NTN connections are available. In contrast, a UE 115 (e.g., a dual mode UE) may trigger TN-to-NTN mobility if the UE 115 moves from NTN and TN coverage to NTN-only coverage. For example, to prioritize a TN connection over an NTN connection, the UE 115 may refrain from switching to an NTN connection if a TN connection is available to the UE 115. However, if the UE 115 is outside TN coverage but within NTN coverage, the UE 115 may switch to an NTN connection to maintain communications with the network.

To support NTN-to-TN mobility, the UE 115 may perform a cell measurement procedure. For example, if the UE 115 is connected to the network via a non-terrestrial network entity 105, the UE 115 may monitor for one or more signals (e.g., synchronization signals) from a terrestrial network entity 105 during a measurement gap. In some cases, the non-terrestrial network entity 105 may operate via a first carrier frequency, and the terrestrial network entity 105 may operate via a second carrier frequency. To measure for synchronization signals from the terrestrial network entity 105, the UE 115 may tune away from the first carrier frequency to the second carrier frequency during the measurement gap. Tuning away from the first carrier frequency may involve the UE 115 suspending communications via the first carrier frequency and tuning a radio frequency (RF) module of the UE 115 to communicate via the second carrier frequency for a portion of time (e.g., during the measurement gap). That is, the time duration during which the UE 115 suspends communications with a serving cell (e.g., the non-terrestrial network entity 105) to measure signaling for a neighboring cell (e.g., the terrestrial network entity 105 operating in a different frequency region) may be referred to as a measurement gap.

The network may configure the UE 115 with a measurement gap configuration. For example, the non-terrestrial network entity 105 may transmit a control signal to the UE 115 configuring one or more parameters for the measurement gap. Such parameters may configure the UE 115 to perform the cell measurement procedure concurrent to when the terrestrial network entity 105 is transmitting at least one synchronization signal, enabling the UE 115 to receive a synchronization signal from the terrestrial network entity 105. Aligning the measurement gap for the UE 115 with synchronization signal transmission by the terrestrial network entity 105 may involve timing coordination between the non-terrestrial network entity 105 and the terrestrial network entity 105. For example, a first timing tracked at the non-terrestrial network entity 105 may be different from a second timing tracked at the terrestrial network entity 105. However, because timing for a non-terrestrial network entity 105 drifts over time (e.g., due to movement of a satellite 185) while timing for a terrestrial network entity 105 remains relatively constant, a timing offset between the first timing tracked at the non-terrestrial network entity 105 and the second timing tracked at the terrestrial network entity 105 may change relatively quickly (e.g., may change by a threshold amount within a threshold time period).

To support accurate timing for a measurement gap configuration, the non-terrestrial network entity 105 may use an absolute timing for the terrestrial network entity 105 (e.g., as opposed to a measurement gap offset between the timing of the non-terrestrial network entity 105 and the timing of the terrestrial network entity 105). The absolute timing for the terrestrial network entity 105 may mitigate any potential timing misalignment at a UE 115 between the measurement gap configuration and the synchronization signaling by the terrestrial network entity 105.

For example, the non-terrestrial network entity 105 (e.g., using a network entity communications manager 101) may request a reference timestamp (e.g., an absolute timing) from the terrestrial network entity 105. The terrestrial network entity 105 (e.g., using a network entity communications manager 101) may transmit the reference timestamp in response to the request. The non-terrestrial network entity 105 may transmit, to the UE 115, an indication of the reference timestamp for the terrestrial network entity 105. The UE 115 (e.g., using a UE communications manager 102) may determine a timing for a measurement gap using the reference timestamp. For example, the UE 115 may monitor, as part of a cell measurement procedure, for a synchronization signal from the terrestrial network entity 105 during the measurement gap based on the reference timestamp. If the UE 115 detects the synchronization signal from the terrestrial network entity 105, in some examples, the UE 115 may trigger NTN-to-TN mobility. The UE 115 may switch a connection to the network from using the non-terrestrial network entity 105 to using the terrestrial network entity 105, improving signaling reliability and latency based on switching to the TN connection.

Figure 2:
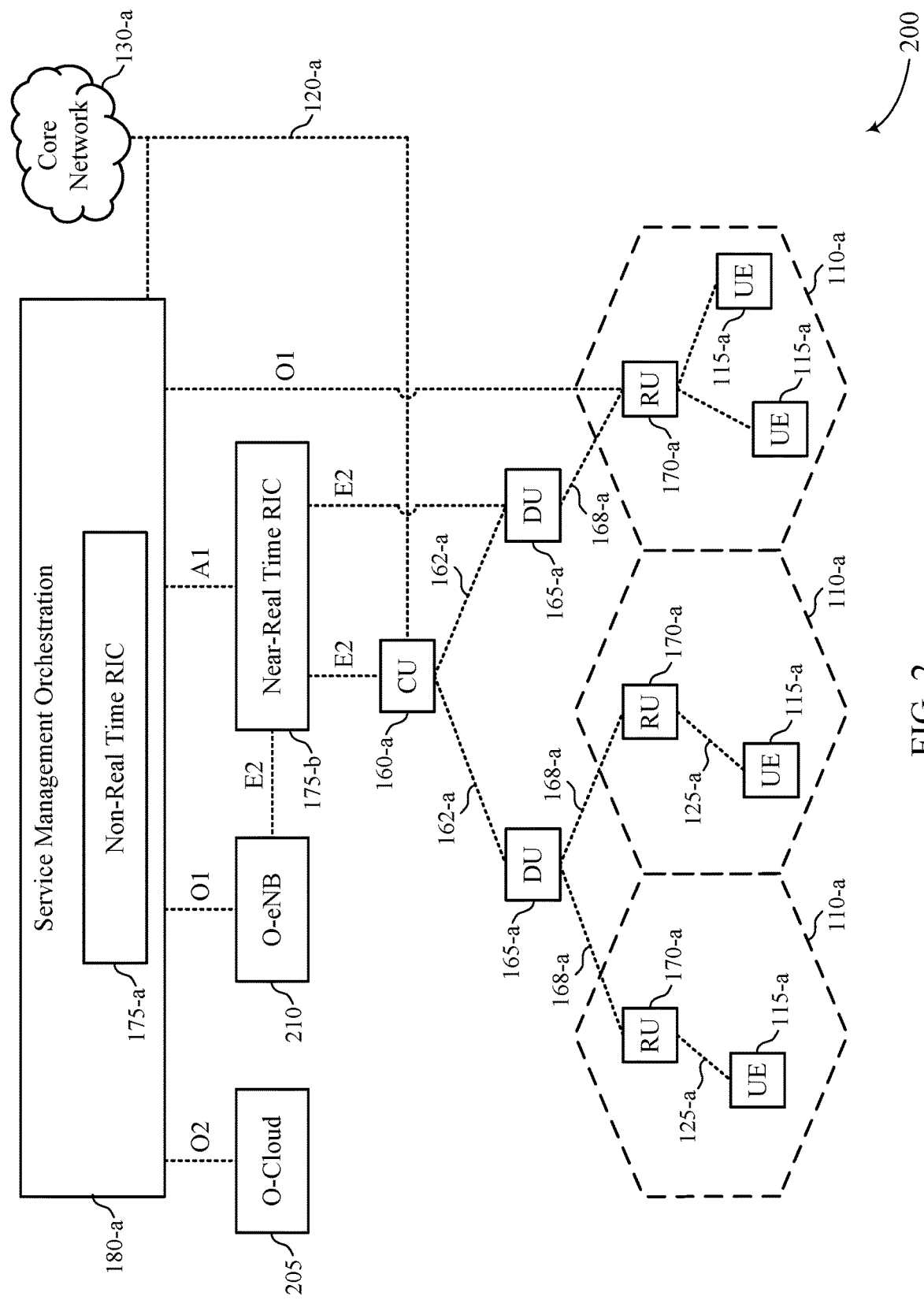
FIG. 2 illustrates an example of a network architecture that supports UE mobility between an NTN and a TN in accordance with one or more aspects of the present disclosure.

FIG. 2 illustrates an example of a network architecture 200 that supports UE mobility between an NTN and a TN in accordance with one or more aspects of the present disclosure. The network architecture 200 (e.g., a disaggregated base station architecture, a disaggregated RAN architecture) may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an AI interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

The network architecture 200 may support NTN-TN mobility. For example, any combination of the network entities included in the network architecture 200 may support a non-terrestrial network entity 105, a terrestrial network entity 105, or a combination thereof. A non-terrestrial network entity 105 may include an RU 170-a, a DU 165-a, a CU 160-a, or any combination thereof (e.g., as components or otherwise connected with a satellite 185 or other non-terrestrial network entity 105). Similarly, a terrestrial network entity 105 may include an RU 170-a, a DU 165-a, a CU 160-a, or any combination thereof (e.g., as components or otherwise connected with a base station 140 or other terrestrial network entity 105). The network may handover a UE 115-a from a non-terrestrial network entity 105 to a terrestrial network entity 105 (or vice versa) to maintain a connection with the UE 115-a. In some examples, the network, the UE 115-a, or both may prioritize TN connections over NTN connections (e.g., for improved signaling reliability, reduced signaling latency).

Figure 3:
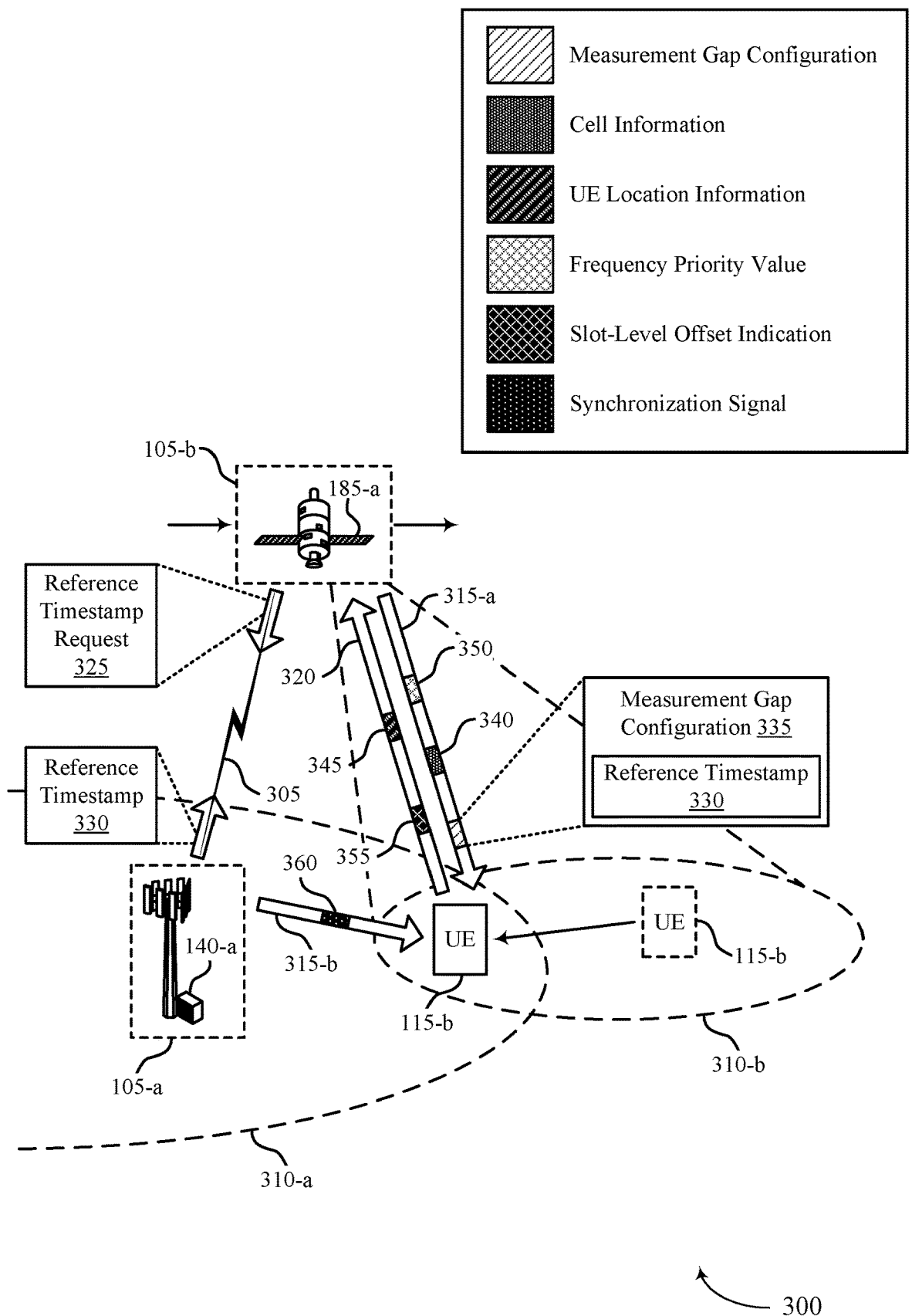
FIGS. 3 and 4 illustrate examples of wireless communications systems that support UE mobility between an NTN and a TN in accordance with one or more aspects of the present disclosure.

FIG. 3 illustrates an example of a wireless communications system 300 that supports UE mobility between an NTN and a TN in accordance with one or more aspects of the present disclosure. The wireless communications system 300 may be an example of a wireless communications system 100 as described with reference to FIG. 1. In some examples, the wireless communications system 300 may include a network architecture 200 as described with reference to FIG. 2. The wireless communications system 300 may include a UE 115-b, which may be an example of a UE 115 as described with reference to FIGS. 1 and 2, and a network entity 105-*a* and a network entity 105-*b*, which may be examples of network entities 105 as described with reference to FIGS. 1 and 2. In some cases, the network entity 105-*a* may be an example of a terrestrial network entity 105-*a*—such as a base station 140-*a*—and the network entity 105-*b* may be an example of a non-terrestrial network entity 105-*b*—such as a satellite 185-*a*. The wireless communications system 300 may support NTN-to-TN mobility for the UE 115-*b* using a reference timestamp 330 to indicate timing for the terrestrial network entity 105-*a*.

The terrestrial network entity 105-*a* may provide network coverage for a first cell 310-*a* (e.g., a TN cell 310-*a*). The non-terrestrial network entity 105-*b* may provide network coverage for a second cell 310-*b* (e.g., an NTN cell 310-*b*). In some cases, the UE 115-*b* may initially be connected to the network via the non-terrestrial network entity 105-*b*, which may include or be an example of a satellite 185-*a*. For example, the UE 115-*b* may be located within the coverage area of the second cell 310-*b*. The UE 115-*b* may communicate with the non-terrestrial network entity 105-*b* via a downlink channel 315-*a*, an uplink channel 320, or both. In some examples, the UE 115-*b* may be connected to the non-terrestrial network entity 105-*b* based on the UE 115-*b* being in NTN-only coverage (e.g., being located within the coverage area of one or more NTN cells but outside of the coverage area of a TN cell). To improve signaling reliability and latency, the UE 115-*b* may prioritize switching to a TN cell (e.g., the TN cell 310-*a*) if a TN cell is available to the UE 115-*b*.

The UE 115-*b* may move from the NTN-only coverage into NTN and TN coverage (e.g., where the UE 115-*b* is located within the coverage area of one or more NTN cells and one or more TN cells). The UE 115-*b* may perform a cell measurement procedure to detect a TN cell. For example, as part of the cell measurement procedure, the UE 115-*b* may monitor for a synchronization signal 360—such as an SSB on a downlink channel 315-*b* or a broadcast channel—from the terrestrial network entity 105-*a*. If the UE 115-*b* receives a synchronization signal 360 from the terrestrial network entity 105-*a* (e.g., via a downlink channel 315-*b*) and a cell measurement associated with the terrestrial network entity 105-*a* satisfies a threshold (e.g., a reference signal received power (RSRP) for the terrestrial network entity 105-*a* is greater than a threshold RSRP or some other cell measurement condition is met), the UE 115-*b* may initiate a handover procedure from the non-terrestrial network entity 105-*b* to the terrestrial network entity 105-*a*. The UE 115-*b* may establish a connection with the terrestrial network entity 105-*a* and may deactivate a connection with the non-terrestrial network entity 105-*b*.

To support the cell measurement procedure at the UE 115-*b*, the non-terrestrial network entity 105-*b* may transmit a measurement gap configuration 335 to the UE 115-*b*. The measurement gap configuration 335 may configure the UE 115-*b* with parameters associated with performing the cell measurement for a specific neighboring cell, such as the TN cell 310-*a* supported by the terrestrial network entity 105-*a*. The parameters may indicate to the UE 115-*b* how to perform inter-frequency measurements, inter-RAT measurements, or both for the neighboring cell. For example, if the terrestrial network entity 105-*a* operates via a different carrier frequency than the non-terrestrial network entity 105-*b*, the measurement gap configuration 335 may indicate a time period for the UE 115-*b* to perform cell measurements for the carrier frequency of the terrestrial network entity 105-*a*.

The measurement gap configuration 335 may indicate a measurement gap period, a measurement gap duration, a measurement gap offset, or any combination thereof. The measurement gap period may indicate a periodicity for measurement gaps. The measurement gap duration may indicate a length of time spanned by one instance of a measurement gap. The measurement gap offset may indicate a timing offset between the serving cell (e.g., a primary cell, such as the NTN cell 310-*b*) and a neighbor cell (e.g., such as the TN cell 310-*a*). In some cases, the measurement gap offset may be defined with respect to the timing of the primary cell. For TN mobility (e.g., mobility from a first TN cell to a second TN cell), the timing offset variation between the primary cell and the neighbor cell—both of which are TN cells—may be relatively small (e.g., below a threshold or otherwise negligible). Accordingly, the UE 115-*b* may maintain timing alignment if the UE 115-*b* uses a fixed measurement gap offset received from the primary cell for cell measurement procedures (e.g., radio resource management (RRM) measurement).

However, for NTN-to-TN mobility, the timing offset variation between the primary cell (e.g., an NTN cell 310-*b*) and the neighbor cell (e.g., a TN cell 310-*a*) may be significant (e.g., above a threshold) due to the timing of the NTN cell 310-*b* drifting. For example, the timing of the TN cell 310-*a* may remain relatively constant if the TN cell 310-*a* is stationary, while the timing of the NTN cell 310-*b* may change over time if the NTN cell 310-*b* is mobile (e.g., a satellite 185-*a* moving in orbit). The timing for a cell may correspond to reception timing for a UE 115-*b* served by the cell. As a non-terrestrial network entity 105-*b* moves, the distance between the non-terrestrial network entity 105-*b* and the UE 115-*b* may change significantly (e.g., by greater than a threshold distance). Accordingly, a propagation delay for signaling between the non-terrestrial network entity 105-*b* and the UE 115-*b* may change based on the changing distance the signals travel, causing timing of signal reception at the UE 115-*b* to change. This may be referred to as the timing drifting for the NTN cell 310-*b*. If the drifting timing for the NTN cell 310-*b* exceeds a threshold, the timing offset variation between the NTN cell 310-*b* and the TN cell 310-*a* may similarly exceed a threshold. To maintain timing alignment for a measurement gap at the UE 115-*b*, the non-terrestrial network entity 105-*b* may use absolute timing for the TN cell 310-*a*, as opposed to—or in addition to—a measurement gap offset value, to mitigate the timing of the NTN cell 310-*b* drifting.

For example, the measurement gap configuration 335 may include a reference timestamp 330 indicating an absolute timing for the TN cell 310-*a*. In some examples, the non-terrestrial network entity 105-*b* may transmit, to the terrestrial network entity 105-*a* via a gateway 305, a reference timestamp request 325. The terrestrial network entity 105-*a* may receive the reference timestamp request 325 and determine a reference timestamp 330 for reporting to the non-terrestrial network entity 105-*b*. In some examples, the reference timestamp 330 may be an example of a UTC timestamp, a portion of the UTC timestamp (e.g., some least significant bits of the UTC timestamp), a GNSS timestamp, a portion of the GNSS timestamp (e.g., some least significant bits of the GNSS timestamp), or some other indication of absolute timing for the TN cell 310-*a*. In some cases, the reference timestamp 330 may indicate the timing of a beginning of a frame corresponding to an SFN of zero. For example, the reference timestamp 330 may be a timestamp of the SFN=0 boundary at the terrestrial network entity 105-*a*.

The terrestrial network entity 105-*a* may transmit the reference timestamp 330 to the non-terrestrial network entity 105-*b* in response to the reference timestamp request 325. Additionally, or alternatively, the terrestrial network entity 105-*a* may transmit the reference timestamp 330 according to a periodicity. For example, the terrestrial network entity 105-*a* may periodically provide, to the non-terrestrial network entity 105-*b* via the gateway 305, reference timestamps 330 indicating SFN=0 boundaries for the terrestrial network entity 105-*a*.

The non-terrestrial network entity 105-*b* may receive the reference timestamp 330 and may transmit the reference timestamp 330 (or an indication of the reference timestamp 330) to the UE 115-*b*. For example, the non-terrestrial network entity 105-*b* may indicate the reference timestamp 330 in the measurement gap configuration 335. The measurement gap configuration 335 may be an example of a control signal (e.g., a first signal), such as an RRC signal. The measurement gap configuration 335 may include a field indicating the reference timestamp 330. The field may include a value indicating a UTC timestamp, a portion of the UTC timestamp (e.g., some least significant bits of the UTC timestamp), a GNSS timestamp, a portion of the GNSS timestamp (e.g., some least significant bits of the GNSS timestamp), or some other indication of absolute timing for the TN cell 310-*a*. In some cases, non-terrestrial network entities may transmit measurement gap configurations 335 including the field indicating the reference timestamp 330, while terrestrial network entities may transmit measurement gap configurations 335 without the field indicating the reference timestamp 330. Alternatively, terrestrial network entities may transmit measurement gap configurations 335 with the field indicating the reference timestamp 330 set to a reference timestamp for a neighbor cell (e.g., a neighboring TN cell or a neighboring NTN cell for cell measurement), set to a default value, set to a random value, reused to indicate other information, or any combination thereof.

The UE 115-*b* receiving the measurement gap configuration 335 may use the reference timestamp 330 for the TN cell 310-*a* to determine a measurement gap window for measuring the TN cell 310-*a*. For example, the UE 115-*b* may determine the timing for the TN cell 310-*a* based on the reference timestamp 330, a measurement gap offset value indicated in the measurement gap configuration 335, or both. Using the parameters indicated in the measurement gap configuration 335, the UE 115-*b* may determine a periodicity of the measurement gap, a duration of the measurement gap, and a start time for the measurement gap, allowing the UE 115-*b* to tune an RF module of the UE 115-*b* to the carrier frequency of the TN cell 310-*a* during the measurement gap (e.g., for at least a portion of the measurement gap). The UE 115-*b* may monitor the carrier frequency of the TN cell 310-*a* for a synchronization signal 360 during the measurement gap to support NTN-to-TN mobility based on the reference timestamp 330.

If the UE 115-*b* detects the TN cell 310-*a* (e.g., based on receiving the synchronization signal 360 during the measurement gap), the UE 115-*b* may determine the timing for the TN cell 310-*a* based on a reference timestamp 330 received from the terrestrial network entity 105-*a*. For example, initially, the UE 115-*b* may determine the timing for the TN cell 310-*a* based on the reference timestamp 330 received from the non-terrestrial network entity 105-*b* (e.g., in the measurement gap configuration 335). If the UE 115-*b* receives the synchronization signal 360 from the terrestrial network entity 105-*a*, the UE 115-*b* may receive a timestamp (e.g., GNSS timestamp) indicated in the synchronization signal 360 or in another signal from the terrestrial network entity 105-*a*. The UE 115-*b* (e.g., while camped on—or otherwise connected to the network via—the NTN cell 310-*b*) may use the timestamp to determine the timing of the TN cell 310-*a* (e.g., instead of using a measurement gap offset calculation based on the measurement gap configuration 335).

In some examples, the UE 115-*b* may report to the non-terrestrial network entity 105-*b* if the UE 115-*b* detects timing misalignment. For example, the UE 115-*b* may determine if the absolute timing-based (e.g., reference timestamp 330-based) measurement gap offset for the TN cell 310-*a* determined at the UE 115-*b* crosses a downlink slot boundary of the NTN cell 310-*b*. The UE 115-*b* may trigger transmitting a slot-level offset indication 355 (e.g., reporting the slot-level measurement gap offset determined at the UE 115-*b*) to the non-terrestrial network entity 105-*b* (e.g., via an uplink MAC control element (CE) or another uplink control signal). In some cases, the non-terrestrial network entity 105-*b* may transmit an additional reference timestamp request 325 to the terrestrial network entity 105-*a* in response to the slot-level offset indication 355, and the non-terrestrial network entity 105-*b* may transmit another measurement gap configuration 335 with an updated reference timestamp 330 to the UE 115-*b* based on the additional reference timestamp request 325.

The UE 115-*b* and the non-terrestrial network entity 105-*b* may communicate location information to support NTN-to-TN mobility. For example, the UE 115-*b* may transmit UE location information 345 to the non-terrestrial network entity 105-*b*. This UE location information 345 may be an example of coarse location information (e.g., indicating an area or region) or fine location information (e.g., indicating specific coordinates for the UE 115-*b*). The UE 115-*b* may include the UE location information 345 in a control signal (e.g., an uplink MAC-CE, uplink control information (UCI)) or a data signal. Using the UE location information 345, the non-terrestrial network entity 105-*b* may determine neighboring cells relatively near the UE 115-*b*. For example, based on the UE location information 345 for the UE 115-*b*, the non-terrestrial network entity 105-*b* may determine that the UE 115-*b* is entering or within the coverage area of the TN cell 310-*a*. The non-terrestrial network entity 105-*b* may transmit, to the UE 115-*b*, a control signal indicating a frequency layer (e.g., carrier frequency) of the TN cell 310-*a*, a reference location of the TN cell 310-*a*, or both (e.g., in cell information 340). Additionally, or alternatively, the non-terrestrial network entity 105-*b* may transmit the measurement gap configuration 335 with the reference timestamp 330 for the TN cell 310-*a* based on the UE location information 345.

In some cases, the non-terrestrial network entity 105-*b* may transmit cell information 340 for multiple cells to the UE 115-*b*. The cell information 340 may include an indication of a reference location for a neighbor cell (e.g., a TN cell 310-*a*), an indication of a distance threshold for a neighbor cell (e.g., the TN cell 310-*a*), or both. The reference location may be provided with a coarse granularity (e.g., indicating an area, such as a city center location near the UE's location) or a fine granularity (e.g., indicating specific coordinates of the terrestrial network entity 105-*a* serving the TN cell 310-*a*). In some examples, the non-terrestrial network entity 105-*b* may provide cell information 340 for cells within a specific distance threshold from the UE 115-*b* (e.g., based on the UE location information 345). In some such examples, the non-terrestrial network entity 105-*b* may transmit, to the UE 115-*b*, a list of TN cell reference location and distance threshold pairs corresponding to respective TN cells. The UE 115-*b* may use the cell information 340 to trigger cell measurements for neighboring cells (e.g., TN cells). For example, the UE 115-*b* may initiate a cell measurement procedure—and, in some cases, cell measurement reporting to the network—for a TN cell 310-*a* if the UE's distance to the TN cell reference location is less than the distance threshold for the specific TN cell 310-*a*. Alternatively, the UE 115-*b* may use a default distance threshold for triggering cell measurements instead of cell-specific distance thresholds.

Additionally, or alternatively, the UE 115-*b*, the non-terrestrial network entity 105-*b*, or both may use frequency prioritization to prioritize TN cell connections. In some examples, the UE 115-*b* may support different priority values for different frequency layers (e.g., carrier frequencies, frequency ranges). In some cases, the non-terrestrial network entity 105-*b* may indicate, to the UE 115-*b*, a frequency priority value 350 for a target frequency layer (e.g., the carrier frequency for a neighboring TN cell 310-*a*). The non-terrestrial network entity 105-*b* may indicate the frequency priority value 350 in a measurement object configuration for connected mode inter-frequency mobility, inter-RAT mobility, or both. For example, the non-terrestrial network entity 105-*b* may configure a relatively greater priority for a TN frequency layer (e.g., the carrier frequency for a TN cell) as compared to an NTN frequency layer (e.g., the carrier frequency for an NTN cell), or at least an equal priority for the TN and NTN frequency layers. In some examples, the non-terrestrial network entity 105-*b* may include an integer value (e.g., between 0 and 7) in a cell selection or reselection configuration indicating a specific priority level for a carrier frequency (e.g., where 0 may indicate a lowest priority and 7 may indicate a highest priority). Additionally, or alternatively, the non-terrestrial network entity 105-*b* may include an indication of a decimal value to add to the integer value to calculate the priority level for a carrier frequency. The non-terrestrial network entity 105-*b* may indicate the frequency priority value 350 for connected mode mobility at the UE 115-*b*, for idle mode mobility at the UE 115-*b*, or both.

Alternatively, the UE 115-*b* may determine a frequency priority value 350 for a carrier frequency based on the corresponding cell type (e.g., a TN cell). For example, if the non-terrestrial network entity 105-*b* does not indicate a relatively greater priority for a TN frequency layer than an NTN frequency layer, the UE 115-*b* may override the priority setting for the TN frequency layer, the NTN frequency layer, or both if the UE 115-*b* identifies the cell type for the TN frequency layer, the NTN frequency layer, or both. The UE 115-*b* may determine the cell type for a frequency layer (e.g., a carrier frequency or frequency range) based on other information, such as a band number for the frequency layer, operator information in a subscriber identity module (SIM), or other side information. For example, the UE 115-*b* may determine that a first frequency layer corresponds to a TN cell 310-*a* and may assign a frequency priority value 350 to the first frequency layer that is greater than a frequency priority value 350 for a second frequency layer corresponding to an NTN cell.

The UE 115-*b* may perform the cell measurement procedure based on the frequency priority values 350 for the carrier frequencies of neighboring cells. For example, the UE 115-*b* may trigger performing a cell measurement and reporting cell measurement information for a neighboring cell corresponding to a relatively greater frequency priority value 350, and the UE 115-*b* may refrain from performing a cell measurement and reporting cell measurement information for a neighboring cell corresponding to a relatively lower frequency priority value 350. The UE 115-*b* may trigger cell measurement and cell measurement reporting for a relatively lower priority cell (e.g., corresponding to a frequency layer assigned a relatively lower frequency priority value 350) if the UE 115-*b* fails to detect a neighbor cell with an equal or relatively greater frequency priority value 350 or if the qualities of neighbor cells with equal or relatively greater frequency priority values 350 fail to satisfy a quality threshold. By assigning the TN cells 310-*a* with relatively greater frequency priority values 350 than NTN cells 310-*b* (e.g., based on a determination at the UE 115-*b* or based on signaling from the non-terrestrial network entity 105-*b*), the UE 115-*b* may effectively prioritize performing cell measurements for TN cells over NTN cells, such that the UE 115-*b* performs NTN-to-TN mobility if a TN cell 310-*a* satisfying a quality threshold is available (e.g., regardless of the availability of NTN cells 310-*b*). In some cases, the UE 115-*b* may explicitly indicate to the non-terrestrial network entity 105-*b* in measurement reporting if the UE 115-*b* has not detected any neighbor TN cells.

Figure 4:
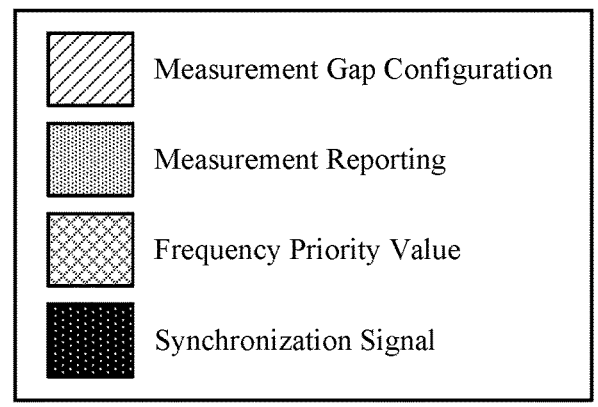
Figure 4:
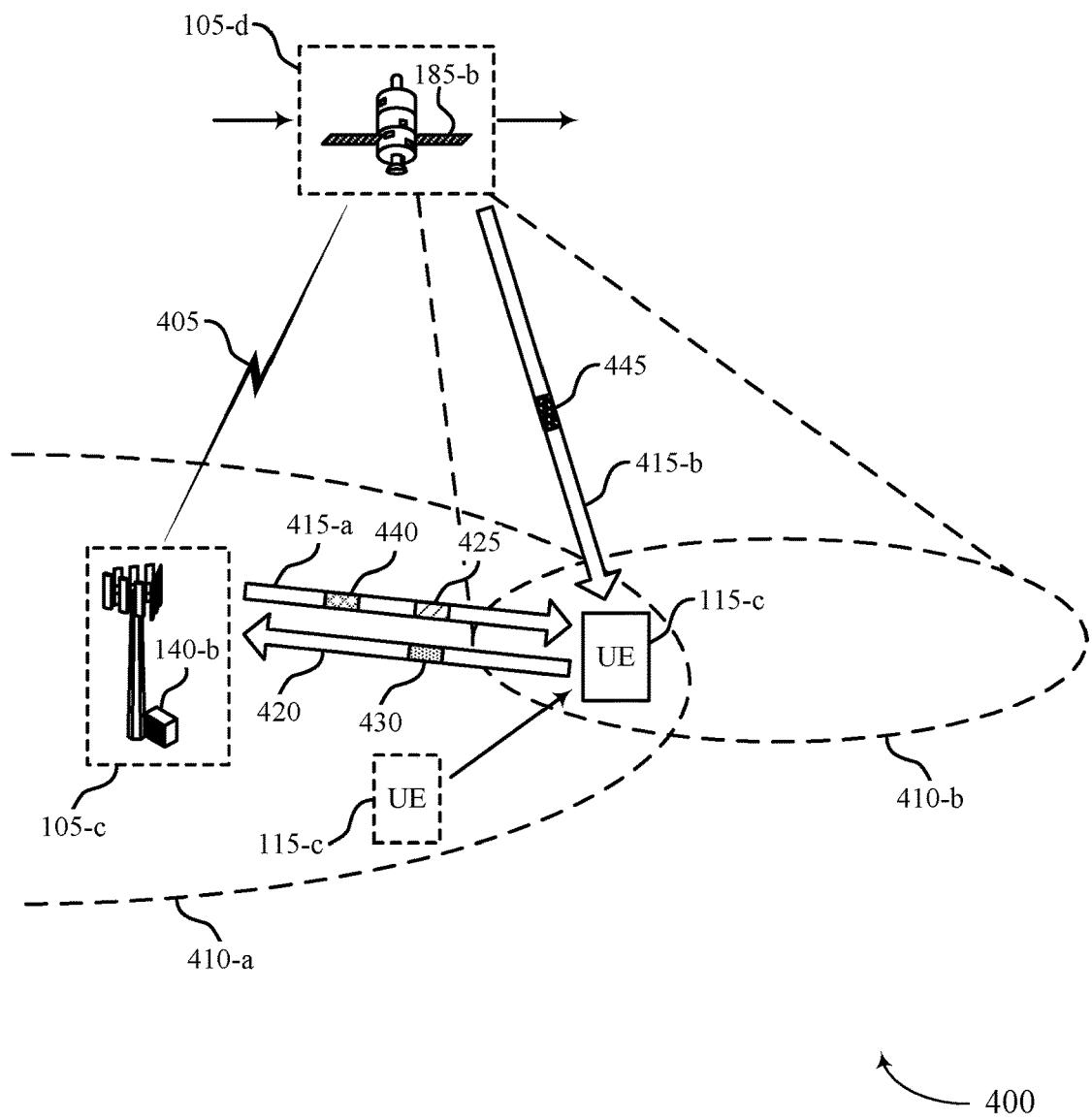

FIG. 4 illustrates an example of a wireless communications system 400 that supports UE mobility between an NTN and a TN in accordance with one or more aspects of the present disclosure. The wireless communications system 400 may be an example of a wireless communications system 100 or a wireless communications system 300 as described with reference to FIGS. 1 and 3. In some examples, the wireless communications system 300 may include a network architecture 200 as described with reference to FIG. 2. The wireless communications system 400 may include a UE 115-*c*, which may be an example of a UE 115 as described with reference to FIGS. 1 through 3, and a network entity 105-*c* and a network entity 105-*d*, which may be examples of network entities 105 as described with reference to FIGS. 1 through 3. In some cases, the network entity 105-*c* may be an example of a terrestrial network entity 105-*c*—such as a base station 140-*b*—and the network entity 105-*d* may be an example of a non-terrestrial network entity 105-*d*—such as a satellite 185-*b*. The network entity 105-*c* and the network entity 105-*d* may communicate via a gateway 405. The wireless communications system 400 may support TN-to-NTN mobility for the UE 115-*c* using frequency priority values 440, for example, similar to as described with reference to FIG. 3.

The terrestrial network entity 105-*c* may provide network coverage for a first cell 410-*a* (e.g., a TN cell 410-*a*). The non-terrestrial network entity 105-*d* may provide network coverage for a second cell 410-*b* (e.g., an NTN cell 410-*b*). In some cases, the UE 115-*c* may be connected to the network via the terrestrial network entity 105-*c*, which may include or be an example of a base station 140-*b*. For example, the UE 115-*c* may be located within the coverage area of the first cell 410-*a* and may be camped on the first cell 410-*a* (e.g., connected with the network via the first cell 410-*a*). The UE 115-*c* may communicate with the terrestrial network entity 105-*c* via a downlink channel 415-*a*, an uplink channel 420, or both. The UE 115-*c* may move to a location where NTN coverage is supported (e.g., where the UE 115-*c* is in NTN and TN coverage). However, switching from the TN cell 410-*a* to the NTN cell 410-*b* may reduce the signaling reliability for the UE 115-*c*. To improve signaling reliability and latency, the UE 115-*c* may prioritize remaining connected to the network via a TN cell 410-*a*.

The UE 115-*c*, the terrestrial network entity 105-*c*, or both may use frequency prioritization to prioritize TN cell connections. In some cases, the terrestrial network entity 105-*c* may indicate, to the UE 115-*c*, a frequency priority value 440 for a target frequency layer (e.g., the carrier frequency for a neighboring NTN cell 410-*b*). The terrestrial network entity 105-*c* may indicate the frequency priority value 440 in a measurement object configuration (e.g., a measurement gap configuration 425 or other message) for connected mode inter-frequency mobility, inter-RAT mobility, or both. For example, the terrestrial network entity 105-*c* may configure a relatively lower priority for an NTN frequency layer (e.g., the carrier frequency for an NTN cell) as compared to a TN frequency layer (e.g., the carrier frequency for a TN cell), or at least an equal priority for the NTN and TN frequency layers. The terrestrial network entity 105-*c* may indicate the frequency priority value 440 for connected mode mobility at the UE 115-*c*, for idle mode mobility at the UE 115-*c*, or both.

Alternatively, the UE 115-*c* may determine a frequency priority value 440 for a carrier frequency based on the corresponding cell type (e.g., an NTN cell). For example, if the terrestrial network entity 105-*c* does not indicate a relatively lower priority for an NTN frequency layer than a TN frequency layer, the UE 115-*c* may override the priority setting for the NTN frequency layer, the TN frequency layer, or both if the UE 115-*c* identifies the cell type for the NTN frequency layer, the TN frequency layer, or both. The UE 115-*c* may determine the cell type for a frequency layer (e.g., a carrier frequency or frequency range) based on other information, such as a band number for the frequency layer, operator information in a SIM, or other side information. For example, the UE 115-*c* may determine that a first frequency layer corresponds to an NTN cell 410-*b* and may assign a frequency priority value 440 to the first frequency layer that is less than a frequency priority value 440 for a second frequency layer corresponding to a TN cell (e.g., the TN cell 410-*a*).

Using the frequency priority values 440, the UE 115-*c* may refrain from performing a cell measurement procedure for the neighboring NTN cell 410-*b*. For example, the UE 115-*c* may refrain from tuning to the carrier frequency for the NTN cell 410-*b* during a measurement gap. Accordingly, the UE 115-*c* may refrain from monitoring for a synchronization signal 445 (e.g., an SSB transmitted on a downlink channel 415-*b* or broadcast channel) from the non-terrestrial network entity 105-*d* during the measurement gap and may refrain from including cell measurements for the NTN cell 410-*b* in measurement reporting 430. Instead, the UE 115-*c* may perform one or more cell measurement procedures for one or more TN cells (e.g., such as the serving cell 410-*a* or neighboring TN cells) that correspond to relatively greater frequency priority values 440. Because the measurement reporting 430 includes cell measurements for TN cells—and not NTN cells—the UE 115-*c* may remain connected to the network via a TN cell if there is an available TN cell satisfying a quality threshold. Using the priority values 440, if the UE 115-*c* is in NTN and TN coverage, the UE 115-*c* may establish or maintain a connection with a TN cell 410-*a*, as opposed to an NTN cell 410-*b*.

Figure 5:
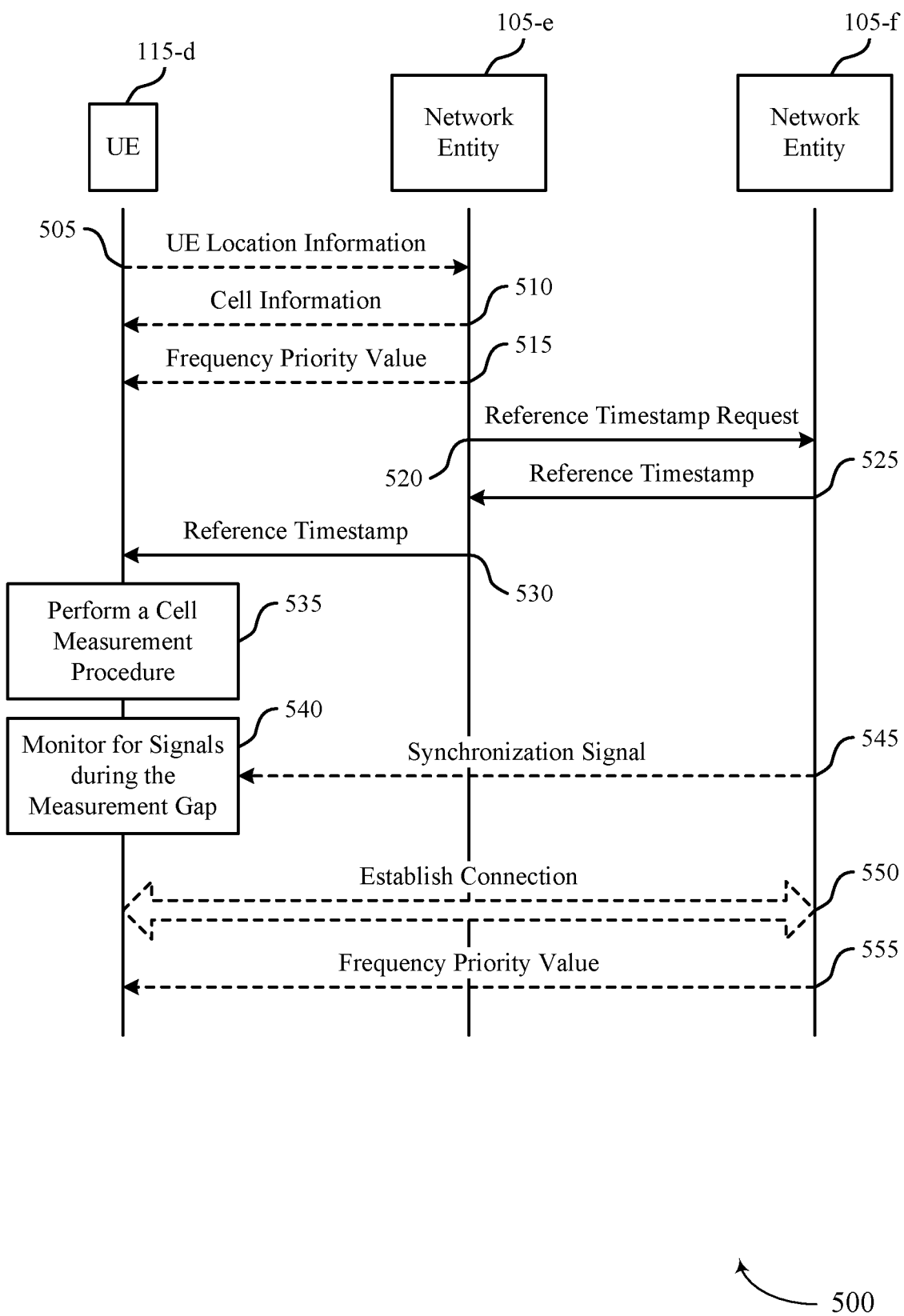
FIG. 5 illustrates an example of a process flow that supports UE mobility between an NTN and a TN in accordance with one or more aspects of the present disclosure.

FIG. 5 illustrates an example of a process flow 500 that supports UE mobility between an NTN and a TN in accordance with one or more aspects of the present disclosure. The process flow 500 may be implemented in a wireless communications system 100, a wireless communications system 300, or a wireless communications system 400 as described with reference to FIGS. 1, 3, and 4. The process flow 500 may include a UE 115-*d*, which may be an example of a UE 115 as described with reference to FIGS. 1 through 4, and may include a first network entity 105-*e* and a second network entity 105-*f*, which may be examples of network entities 105 as described with reference to FIGS. 1 through 4. The process flow 500 may support NTN-TN mobility for the UE 115-*d*. In the following description of the process flow 500, the operations performed by the devices may be performed in different orders or at different times. Additionally, or alternatively, some operations may be omitted from the process flow 500, and other operations may be added to the process flow 500.

The first network entity 105-*e* may be associated with a first cell type and may operate via a first carrier frequency, while the second network entity 105-*f* may be associated with a second cell type (e.g., different from the first cell type) and may operate via a second carrier frequency (e.g., different from the first carrier frequency). For example, the first cell type may be an NTN cell type (e.g., the first network entity 105-*e* may be a non-terrestrial network entity 105-*e*), and the second cell type may be a TN cell type (e.g., the second network entity 105-*f* may be a terrestrial network entity 105-*f*).

At 505, in some examples, the UE 115-*d* may transmit, to the first network entity 105-*e*, a signal indicating location information for the UE 115-*d*. The signal indicating the UE location information may be an example of a control signal, such as an RRC signal, a MAC-CE, UCI, or any combination thereof. The first network entity 105-*e* may obtain the signal indicating the location information for the UE 115-*d* (e.g., first location information).

At 510, in some examples, the first network entity 105-*e* may output a signal indicating cell information for a set of cells. For example, the first network entity 105-*e* may output a signal indicating location information and distance thresholds for a set of cells associated with the second cell type (e.g., TN cells). The signal may indicate at least a location and a distance threshold for the second network entity 105-*f*. The UE 115-*d* may receive the signal indicating the cell information and may use the cell information to initiate a cell measurement procedure. For example, the UE 115-*d* may receive the indication of the location and the distance threshold for the second network entity 105-*f* and may initiate monitoring for signaling (e.g., synchronization signaling) from the second network entity 105-*f* if the UE 115-*d* is within the distance threshold of the location of the second network entity 105-*f*.

At 515, in some examples, the first network entity 105-*e* may output a signal indicating a priority value (e.g., a frequency priority value) for the frequency layer of the second network entity 105-*f*. For example, the first cell type (e.g., an NTN cell)—and, correspondingly, the first carrier frequency—may correspond to a first priority value, and the signal may indicate a second priority value for the second carrier frequency associated with the second network entity 105-*f* based on the second carrier frequency corresponding to the second cell type (e.g., a TN cell). The second priority value may be greater than the first priority value, for example, to prioritize TN cell measurement over NTN cell measurement. In some examples, the signal indicating the priority value may be the signal including an indication of a reference timestamp for a measurement gap (e.g., a measurement gap configuration message). The UE 115-*d* may receive the signal indicating the priority value for the frequency layer of the second network entity 105-*f* and may monitor for signaling (e.g., synchronization signaling) from the second network entity 105-*f* based on the priority value for the frequency layer of the second network entity 105-*f*. In some examples, the UE 115-*d* may be operating according to connected mode mobility, and the second priority value for the second carrier frequency may correspond to a configuration for the connected mode mobility.

Alternatively, the UE 115-d may determine the priority value for the frequency layer of the second network entity 105-f if the first network entity 105-e does not configure the priority value, or the UE 115-d may override a configuration of the priority value by the first network entity 105-e. For example, the UE 115-d may monitor the second carrier frequency based on a second priority value for the second carrier frequency, where the second priority value is based on the second carrier frequency corresponding to the second cell type (e.g., a TN cell), and the second priority value is greater than the first priority value corresponding to the first cell type (e.g., an NTN cell).

At 520, the first network entity 105-e may output a signal including a request for a reference timestamp corresponding to the second network entity 105-f. For example, the reference timestamp request may be transmitted via a gateway between the first network entity 105-e and the second network entity 105-f. The first network entity 105-e may request the reference timestamp based on the first network entity 105-e being a non-terrestrial network entity and the second network entity 105-f being a terrestrial network entity. The second network entity 105-f may obtain the signal including the request for the reference timestamp corresponding to the second network entity 105-f.

At 525, the second network entity 105-f may output a signal indicating the reference timestamp corresponding to the second network entity 105-f based on the request. The reference timestamp may be an example of a UTC timestamp, a portion of a UTC timestamp, a GNSS timestamp, a portion of a GNSS timestamp, or a combination thereof. In some examples, the reference timestamp may indicate an SFN with a value of zero for the second network entity 105-f. The first network entity 105-e may obtain the signal indicating the reference timestamp corresponding to the second network entity 105-f based on the request. Additionally, or alternatively, the second network entity 105-f may output an additional signal indicating an additional reference timestamp corresponding to the second network entity 105-f according to a periodicity. For example, the second network entity 105-f may repeatedly transmit indications of reference timestamps to the first network entity 105-e according to the periodicity.

At 530, the first network entity 105-e may output a signal including an indication of the reference timestamp corresponding to the second network entity 105-f, the signal configuring a measurement gap for the UE 115-d. In some cases, the signal may include a measurement gap configuration for the UE 115-d, the measurement gap supporting a cell measurement procedure associated with the second network entity 105-f. In some cases, the first network entity 105-e may output the signal indicating the reference timestamp based on the location information for the UE (e.g., the first location information) and location information for the second network entity 105-f (e.g., second location information). The UE 115-d may receive the signal including the indication of the reference timestamp for the measurement gap, the reference timestamp corresponding to the second network entity 105-f.

At 535, the UE 115-d may perform a cell measurement procedure. In some examples, the UE 115-d may trigger the cell measurement procedure for the second network entity 105-f based on the UE's proximity to the second network entity 105-f (e.g., if the UE 115-d is within a threshold distance from the location of the second network entity 105-f). In some examples, the UE 115-d may perform the cell measurement procedure for the second network entity 105-f based on the priority value for the second carrier frequency corresponding to the second network entity 105-f (e.g., a TN cell) being relatively greater than the priority value for the first carrier frequency corresponding to the first network entity 105-e (e.g., an NTN cell).

The cell measurement procedure may involve, at 540, the UE 115-d monitoring, during the measurement gap, the second carrier frequency for a signal (e.g., a synchronization signal) from the second network entity, the measurement gap being based on the reference timestamp. For example, the UE 115-d may determine timing for the second network entity 105-f and, correspondingly, timing for the measurement gap using the reference timestamp indicating absolute timing for the second network entity 105-f. At 545, the second network entity 105-f may output a signal during the measurement gap, where the measurement gap is based on the reference timestamp (e.g., the absolute timing) for the second network entity 105-f. The signal may be an example of a synchronization signal, such as an SSB including a second timestamp corresponding to the second network entity 105-f. In some examples, the UE 115-d may receive the signal (e.g., the synchronization signal) based on the monitoring. If the UE 115-d receives the synchronization signal, the UE 115-d may determine whether the synchronization signal satisfies a threshold (e.g., a signal strength threshold, a signal quality threshold) for the UE 115-d to switch to the second network entity 105-f. For example, at 550, the UE 115-d may switch a connection from the first network entity 105-e to the second network entity 105-f based on one or more measurements of the synchronization signal.

At 555, in some examples, the second network entity 105-f may output a signal indicating a first priority value (e.g., a frequency priority value) for the frequency layer of a network entity, such as the first network entity 105-e, corresponding to the first cell type (e.g., an NTN cell). The first priority value may be less than a second priority value corresponding to the second cell type (e.g., a TN cell). The UE 115-d may receive the signal indicating the priority value for the frequency layer of the first network entity 105-e and may refrain from monitoring for signaling (e.g., synchronization signaling) from the first network entity 105-e based on the priority value for the frequency layer of the first network entity 105-e. Alternatively, the UE 115-d may determine the priority value for the frequency layer of the first network entity 105-e if the second network entity 105-f does not configure the priority value, or the UE 115-d may override a configuration of the priority value by the second network entity 105-f. For example, the UE 115-d may refrain from monitoring the first carrier frequency based on a first priority value for the first carrier frequency, the first priority value based on the first carrier frequency corresponding to the first cell type (e.g., an NTN cell), the first priority value being less than a second priority value corresponding to the second cell type (e.g., a TN cell).

Figure 6:
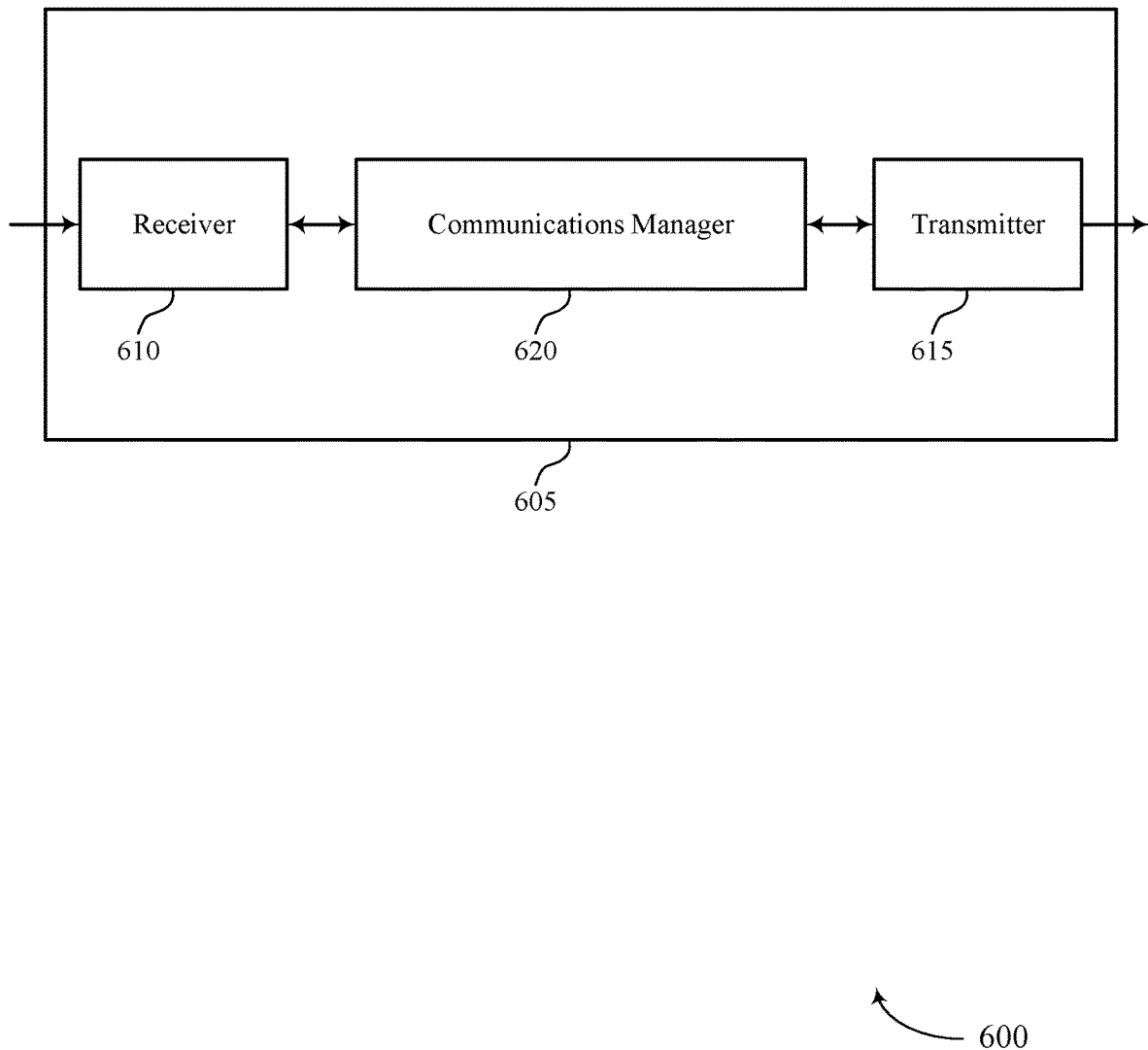
FIGS. 6 and 7 show block diagrams of devices that support UE mobility between an NTN and a TN in accordance with one or more aspects of the present disclosure.

FIG. 6 shows a block diagram 600 of a device 605 that supports UE mobility between an NTN and a TN in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE mobility between an NTN and a TN). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE mobility between an NTN and a TN). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of UE mobility between an NTN and a TN as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving, from a first network entity associated with a first cell type and operating via a first carrier frequency, a first signal including an indication of a reference timestamp for a measurement gap, the reference timestamp corresponding to a second network entity associated with a second cell type and operating via a second carrier frequency. The communications manager 620 may be configured as or otherwise support a means for monitoring, as part of a cell measurement procedure and during the measurement gap, the second carrier frequency for a second signal from the second network entity, the measurement gap being based on the reference timestamp.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for improved timing alignment and reliability for cell measurements. By aligning the measurement gap with the synchronization signaling from a TN cell using a reference timestamp, the device 605 may improve the reliability of detecting synchronization signaling. Improving the detection of synchronization signaling may reduce an amount of time the device 605 monitors for synchronization signaling, effectively reducing the processing overhead at the device 605. Additionally, or alternatively, prioritizing TN connections over NTN connections may improve signaling reliability, effectively reducing the processing overhead involved in retransmitting signals.

Figure 7:
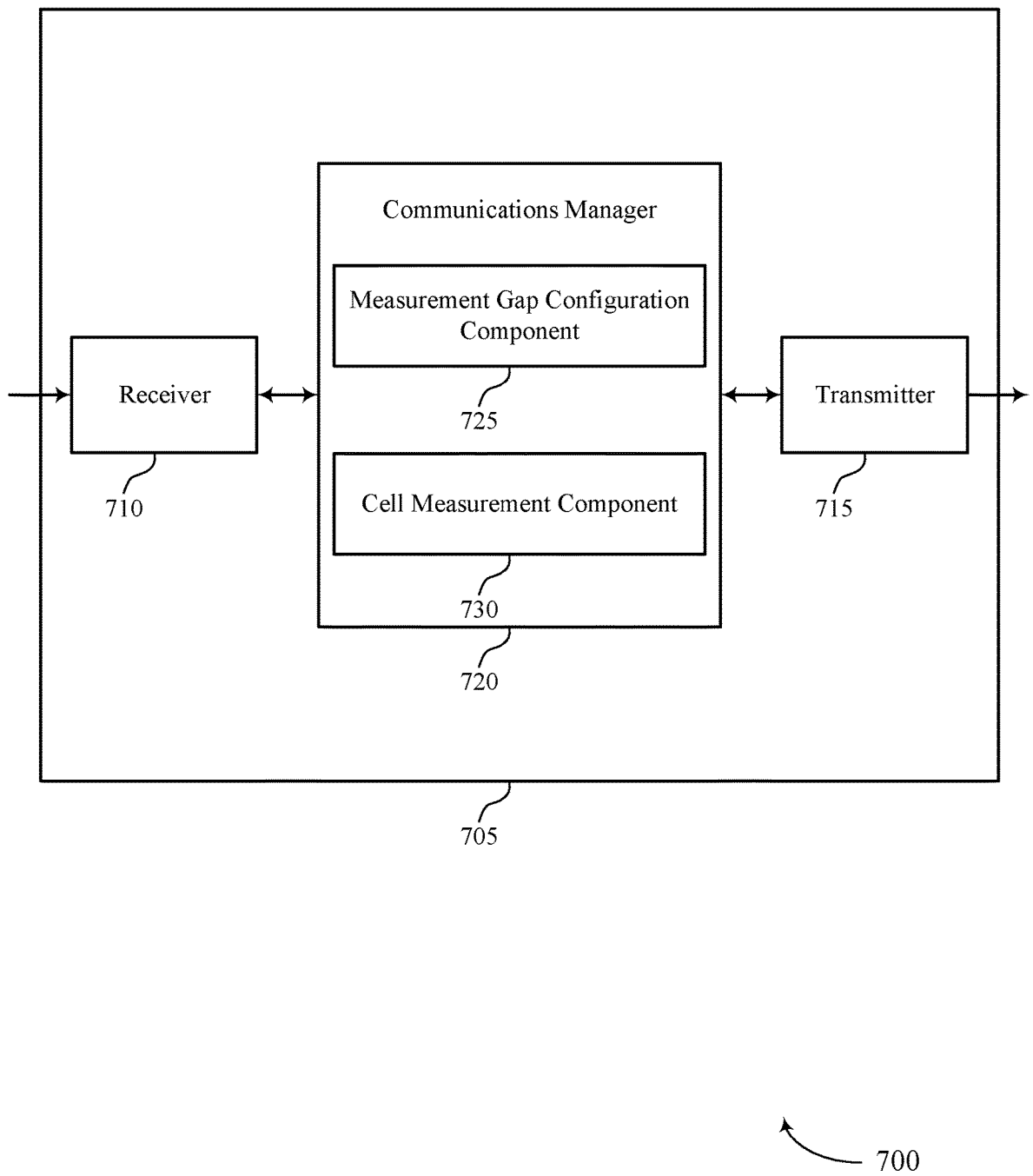

FIG. 7 shows a block diagram 700 of a device 705 that supports UE mobility between an NTN and a TN in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to UE mobility between an NTN and a TN). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to UE mobility between an NTN and a TN). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of UE mobility between an NTN and a TN as described herein. For example, the communications manager 720 may include a measurement gap configuration component 725 a cell measurement component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The measurement gap configuration component 725 may be configured as or otherwise support a means for receiving, from a first network entity associated with a first cell type and operating via a first carrier frequency, a first signal including an indication of a reference timestamp for a measurement gap, the reference timestamp corresponding to a second network entity associated with a second cell type and operating via a second carrier frequency. The cell measurement component 730 may be configured as or otherwise support a means for monitoring, as part of a cell measurement procedure and during the measurement gap, the second carrier frequency for a second signal from the second network entity, the measurement gap being based on the reference timestamp.

Figure 8:
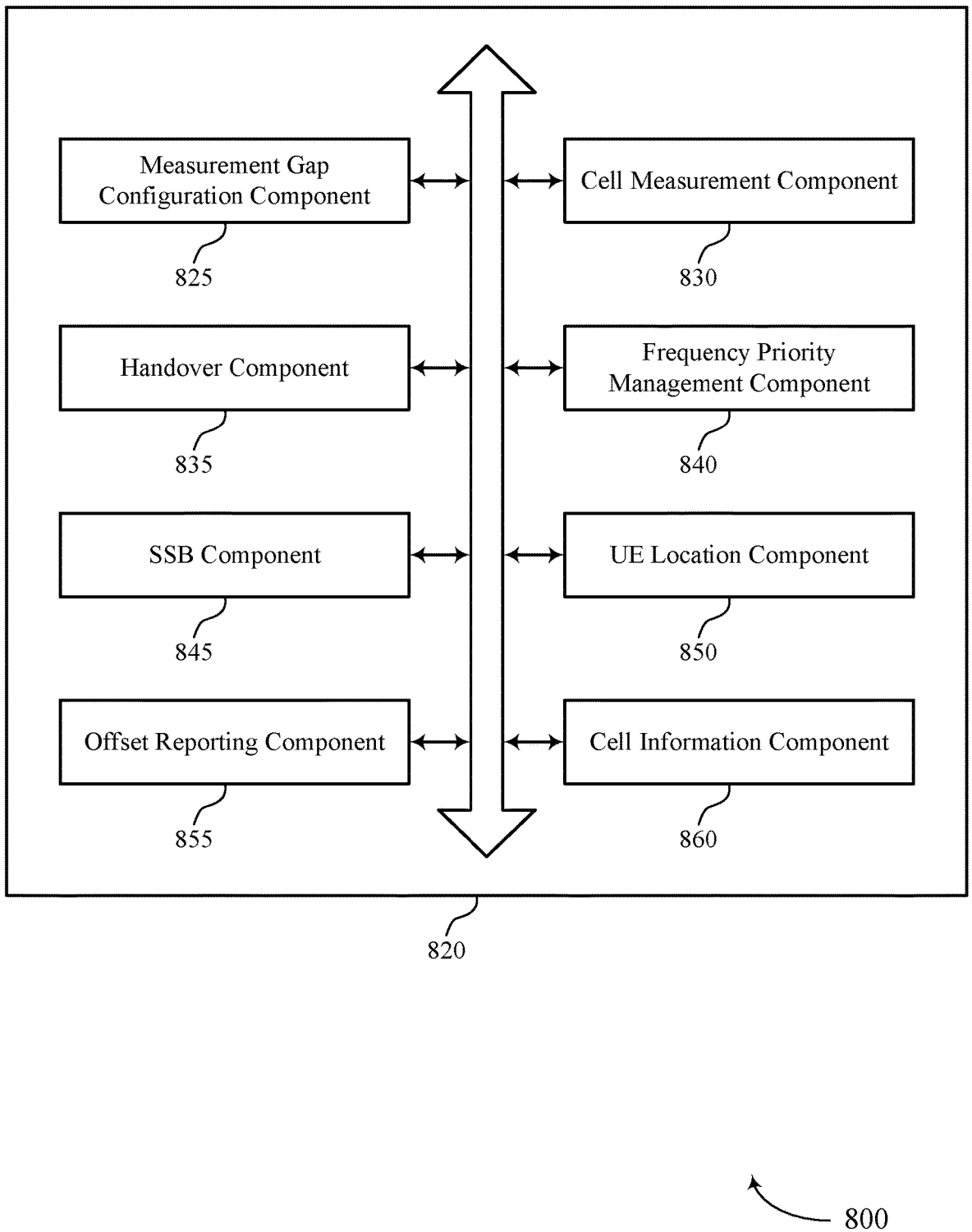
FIG. 8 shows a block diagram of a communications manager that supports UE mobility between an NTN and a TN in accordance with one or more aspects of the present disclosure.

FIG. 8 shows a block diagram 800 of a communications manager 820 that supports UE mobility between an NTN and a TN in accordance with one or more aspects of the present disclosure. The communications manager 820 may be an example of aspects of a communications manager 620, a communications manager 720, or both, as described herein. The communications manager 820, or various components thereof, may be an example of means for performing various aspects of UE mobility between an NTN and a TN as described herein. For example, the communications manager 820 may include a measurement gap configuration component 825, a cell measurement component 830, a handover component 835, a frequency priority management component 840, an SSB component 845, a UE location component 850, an offset reporting component 855, a cell information component 860, or any combination thereof. Each of these components may communicate, directly or indirectly, with one another (e.g., via one or more buses).

The communications manager 820 may support wireless communications at a UE in accordance with examples as disclosed herein. The measurement gap configuration component 825 may be configured as or otherwise support a means for receiving, from a first network entity associated with a first cell type and operating via a first carrier frequency, a first signal including an indication of a reference timestamp for a measurement gap, the reference timestamp corresponding to a second network entity associated with a second cell type and operating via a second carrier frequency. The cell measurement component 830 may be configured as or otherwise support a means for monitoring, as part of a cell measurement procedure and during the measurement gap, the second carrier frequency for a second signal from the second network entity, the measurement gap being based on the reference timestamp.

In some examples, the cell measurement component 830 may be configured as or otherwise support a means for receiving, from the second network entity, the second signal based on the monitoring. In some examples, the handover component 835 may be configured as or otherwise support a means for switching a connection from the first network entity to the second network entity based on one or more measurements of the second signal.

In some examples, the frequency priority management component 840 may be configured as or otherwise support a means for receiving, from the second network entity, a third signal including a first priority value for the first carrier frequency that corresponds to the first cell type, the first priority value being less than a second priority value corresponding to the second cell type. In some examples, the frequency priority management component 840 may be configured as or otherwise support a means for refraining from monitoring the first carrier frequency based on the first priority value.

In some examples, the frequency priority management component 840 may be configured as or otherwise support a means for refraining from monitoring the first carrier frequency based on a first priority value for the first carrier frequency, the first priority value based on the first carrier frequency corresponding to the first cell type, the first priority value being less than a second priority value corresponding to the second cell type.

In some examples, the first cell type corresponds to a first priority value, and the frequency priority management component 840 may be configured as or otherwise support a means for receiving, from the first network entity, a third signal including a second priority value for the second carrier frequency based on the second carrier frequency corresponding to the second cell type, the second priority value being greater than the first priority value corresponding to the first cell type, the monitoring of the second carrier frequency being based on the second priority value.

In some examples, the frequency priority management component 840 may be configured as or otherwise support a means for operating according to connected mode mobility, the second priority value for the second carrier frequency corresponding to a configuration for the connected mode mobility.

In some examples, the frequency priority management component 840 may be configured as or otherwise support a means for monitoring the second carrier frequency based on a second priority value for the second carrier frequency, the second priority value based on the second carrier frequency corresponding to the second cell type, the second priority value being greater than the first priority value corresponding to the first cell type.

In some examples, the SSB component 845 may be configured as or otherwise support a means for receiving, from the second network entity, an SSB including a second timestamp corresponding to the second network entity. In some examples, the cell measurement component 830 may be configured as or otherwise support a means for monitoring, as part of a second cell measurement procedure, for a third signal from the second network entity during the measurement gap based on the second timestamp.

In some examples, the UE location component 850 may be configured as or otherwise support a means for transmitting, to the first network entity, a third signal indicating location information for the UE, the first signal including the indication of the reference timestamp corresponding to the second network entity based on the location information for the UE.

In some examples, the indication of the reference timestamp includes a UTC timestamp, a portion of the UTC timestamp, a GNSS timestamp, a portion of the GNSS timestamp, or a combination thereof. In some examples, the reference timestamp indicates an SFN with a value of zero for the second network entity.

In some examples, the first signal further indicates an offset in a time domain for the measurement gap, a periodicity for the measurement gap, a duration for the measurement gap, or a combination thereof, the monitoring being further based on the offset, the periodicity, the duration, or a combination thereof.

In some examples, the offset reporting component 855 may be configured as or otherwise support a means for transmitting, to the first network entity, a third signal indicating a slot-level offset for the measurement gap based on the measurement gap that is based on the reference timestamp corresponding to the second network entity crossing a downlink slot boundary of the first network entity.

In some examples, the cell information component 860 may be configured as or otherwise support a means for receiving, from the first network entity, a third signal indicating location information and distance thresholds for a set of multiple cells associated with the second cell type, the third signal indicating at least a respective location and a respective distance threshold of the second network entity. In some examples, the cell measurement component 830 may be configured as or otherwise support a means for initiating the monitoring for the second signal from the second network entity based on the UE being within the respective distance threshold of the respective location of the second network entity. In some examples, the first cell type includes an NTN cell type. In some examples, the second cell type includes a TN cell type.

Figure 9:
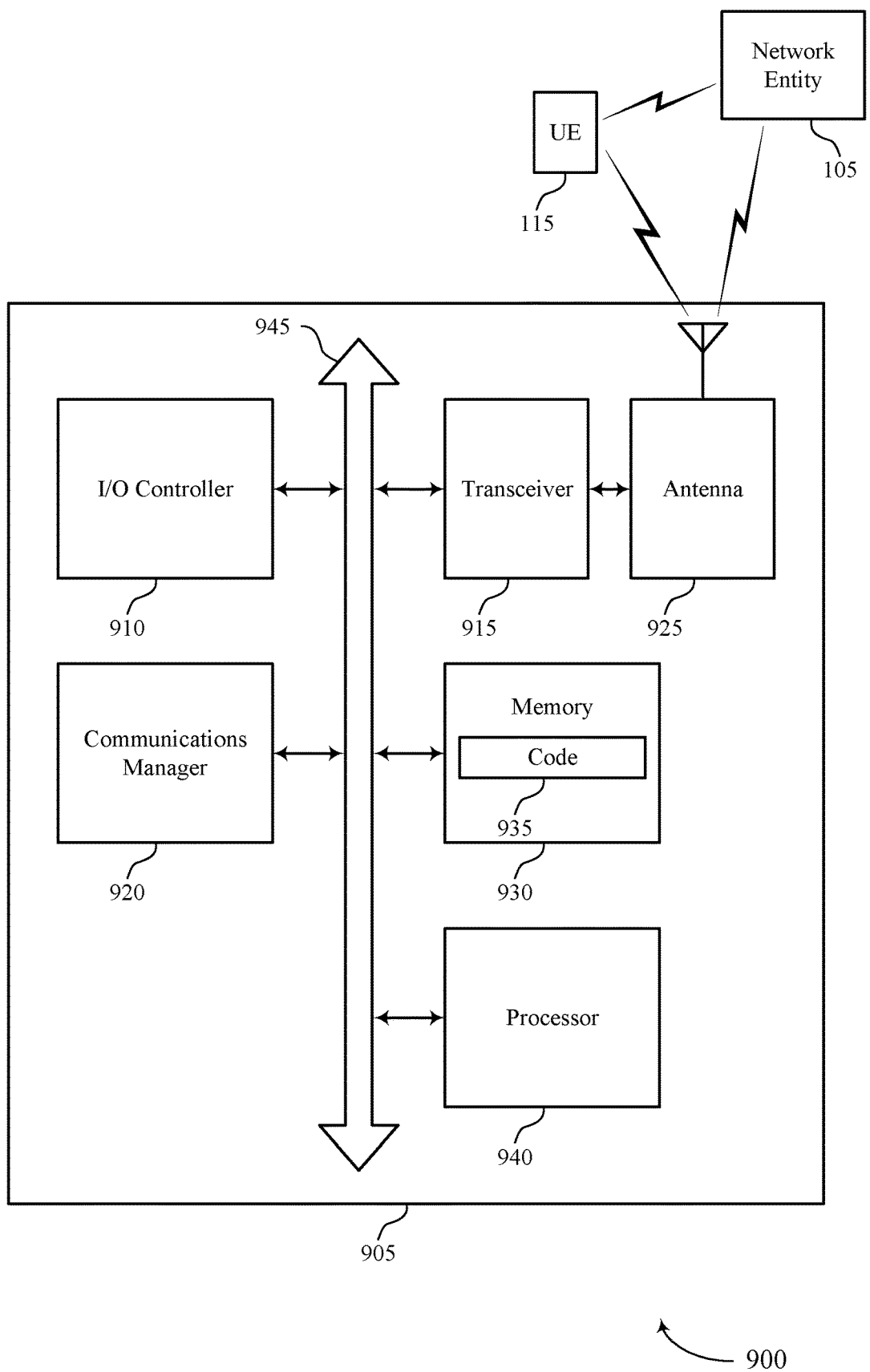
FIG. 9 shows a diagram of a system including a device that supports UE mobility between an NTN and a TN in accordance with one or more aspects of the present disclosure.

FIG. 9 shows a diagram of a system 900 including a device 905 that supports UE mobility between an NTN and a TN in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting UE mobility between an NTN and a TN). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a first network entity associated with a first cell type and operating via a first carrier frequency, a first signal including an indication of a reference timestamp for a measurement gap, the reference timestamp corresponding to a second network entity associated with a second cell type and operating via a second carrier frequency. The communications manager 920 may be configured as or otherwise support a means for monitoring, as part of a cell measurement procedure and during the measurement gap, the second carrier frequency for a second signal from the second network entity, the measurement gap being based on the reference timestamp.

By including or configuring the communications manager 920 in accordance with examples as described herein, the device 905 may support techniques for improved communication reliability, reduced latency, improved coordination of timing information for a cell measurement procedure (e.g., for NTN-to-TN mobility), or any combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of UE mobility between an NTN and a TN as described herein, or the processor 940 and the memory 930 may be otherwise configured to perform or support such operations.

Figure 10:
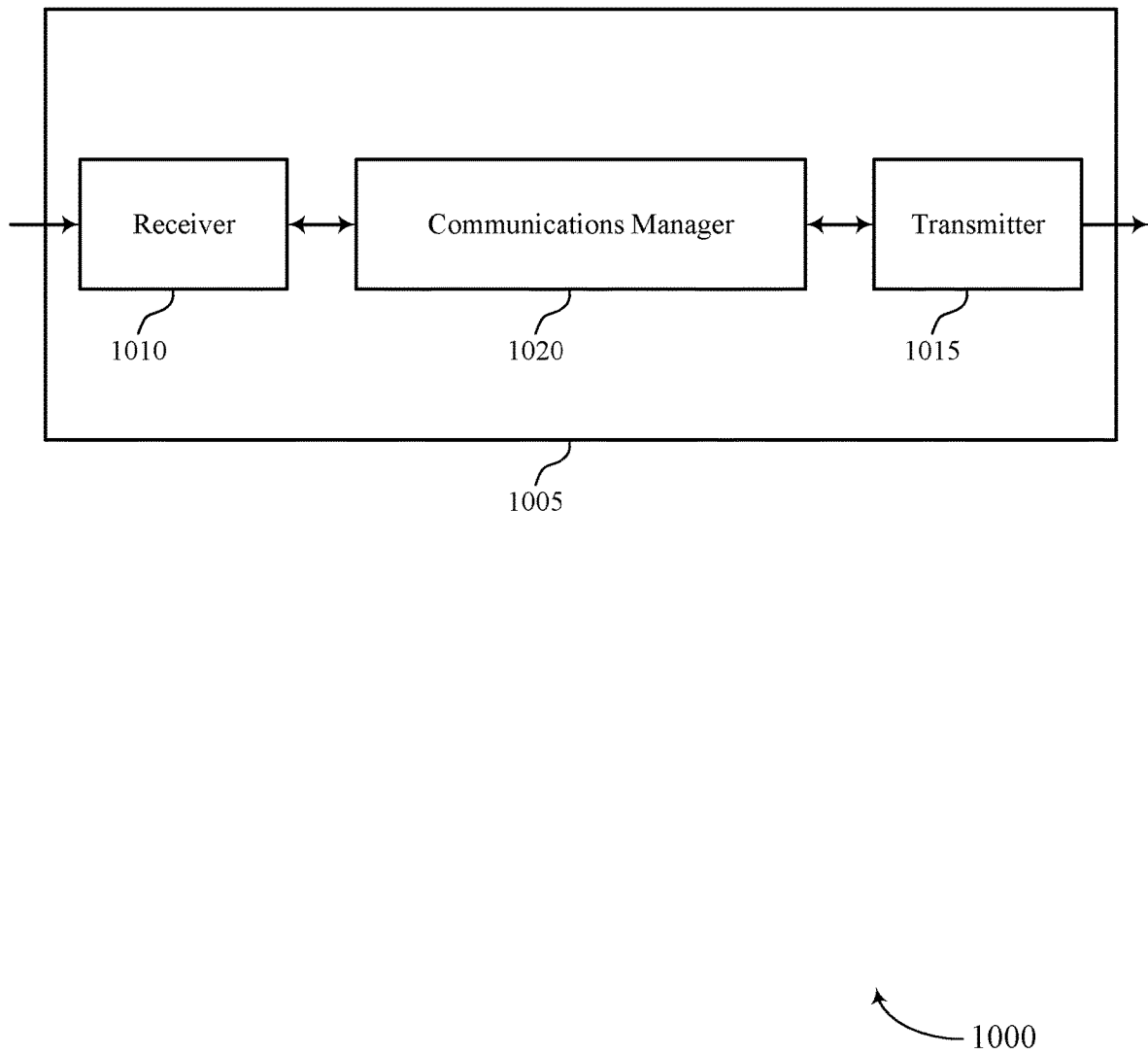
FIGS. 10 and 11 show block diagrams of devices that support UE mobility between an NTN and a TN in accordance with one or more aspects of the present disclosure.

FIG. 10 shows a block diagram 1000 of a device 1005 that supports UE mobility between an NTN and a TN in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of UE mobility between an NTN and a TN as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first network entity in accordance with examples as disclosed herein. For example, the communications manager 1020 may be configured as or otherwise support a means for outputting a first signal including a request for a reference timestamp corresponding to a second network entity, the first network entity being associated with a first cell type and operating via a first carrier frequency and the second network entity being associated with a second cell type and operating via a second carrier frequency. The communications manager 1020 may be configured as or otherwise support a means for obtaining a second signal indicating the reference timestamp corresponding to the second network entity based on the request. The communications manager 1020 may be configured as or otherwise support a means for outputting a third signal including an indication of the reference timestamp corresponding to the second network entity, the third signal configuring a measurement gap for a UE.

Additionally, or alternatively, the communications manager 1020 may support wireless communications at a second network entity in accordance with examples as disclosed herein. For example, the communications manager 1020 may be configured as or otherwise support a means for obtaining a first signal including a request for a reference timestamp corresponding to the second network entity associated with a second cell type, the request being associated with a first network entity, and the first network entity being associated with a first cell type and operating via a first carrier frequency, the second network entity operating via a second carrier frequency. The communications manager 1020 may be configured as or otherwise support a means for outputting a second signal indicating the reference timestamp corresponding to the second network entity based on the request. The communications manager 1020 may be configured as or otherwise support a means for outputting a third signal during a measurement gap, the measurement gap being based on the reference timestamp.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for improving timing alignment between a measurement gap at a UE 115 and synchronization signaling by a terrestrial network entity. Accordingly, the UE 115 may detect and measure the synchronization signaling more reliably, effectively reducing the processing overhead associated with performing synchronization signaling.

Figure 11:
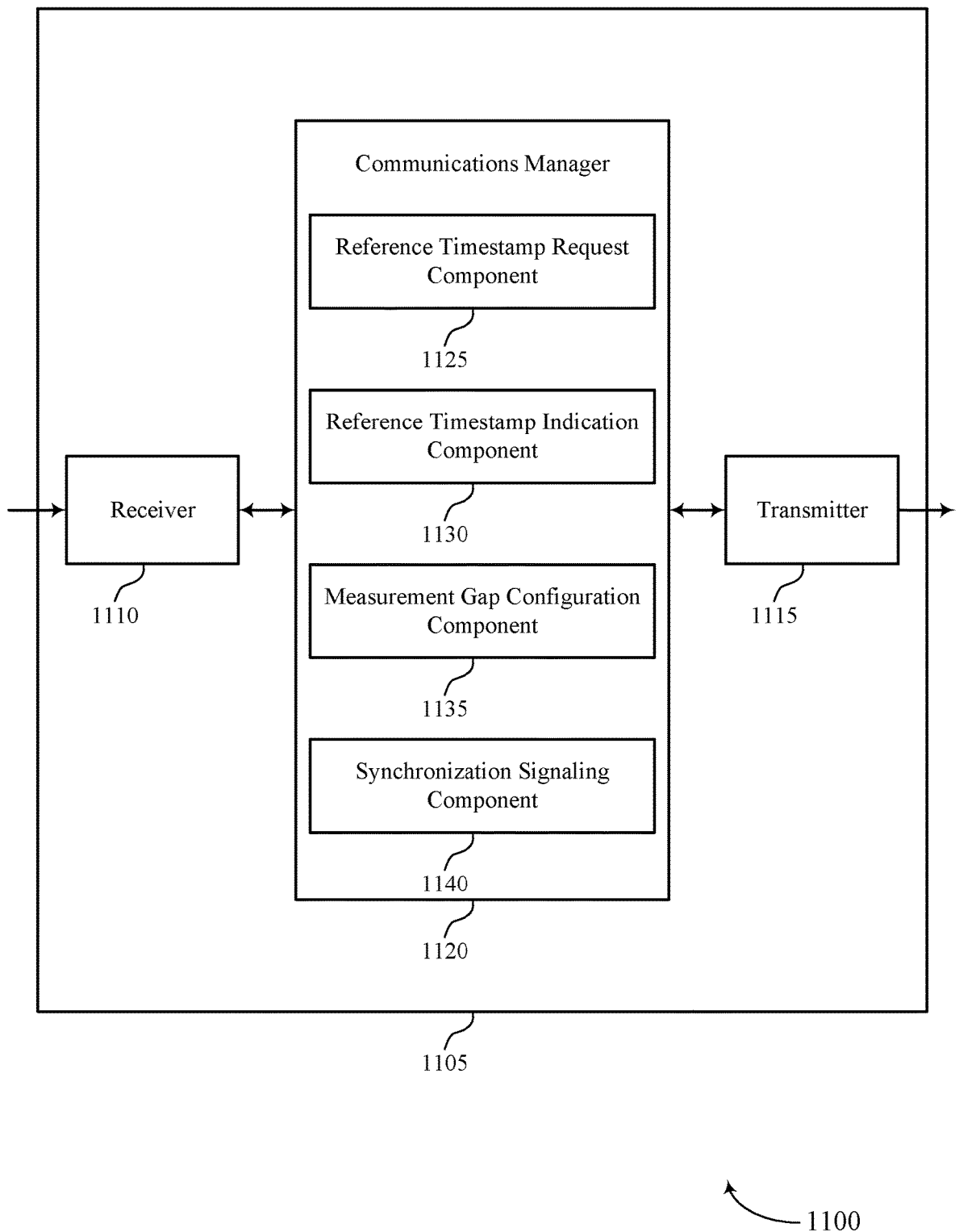

FIG. 11 shows a block diagram 1100 of a device 1105 that supports UE mobility between an NTN and a TN in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of UE mobility between an NTN and a TN as described herein. For example, the communications manager 1120 may include a reference timestamp request component 1125, a reference timestamp indication component 1130, a measurement gap configuration component 1135, a synchronization signaling component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first network entity in accordance with examples as disclosed herein. The reference timestamp request component 1125 may be configured as or otherwise support a means for outputting a first signal including a request for a reference timestamp corresponding to a second network entity, the first network entity being associated with a first cell type and operating via a first carrier frequency and the second network entity being associated with a second cell type and operating via a second carrier frequency. The reference timestamp indication component 1130 may be configured as or otherwise support a means for obtaining a second signal indicating the reference timestamp corresponding to the second network entity based on the request. The measurement gap configuration component 1135 may be configured as or otherwise support a means for outputting a third signal including an indication of the reference timestamp corresponding to the second network entity, the third signal configuring a measurement gap for a UE.

Additionally, or alternatively, the communications manager 1120 may support wireless communications at a second network entity in accordance with examples as disclosed herein. The reference timestamp request component 1125 may be configured as or otherwise support a means for obtaining a first signal including a request for a reference timestamp corresponding to the second network entity associated with a second cell type, the request being associated with a first network entity, and the first network entity being associated with a first cell type and operating via a first carrier frequency, the second network entity operating via a second carrier frequency. The reference timestamp indication component 1130 may be configured as or otherwise support a means for outputting a second signal indicating the reference timestamp corresponding to the second network entity based on the request. The synchronization signaling component 1140 may be configured as or otherwise support a means for outputting a third signal during a measurement gap, the measurement gap being based on the reference timestamp.

Figure 12:
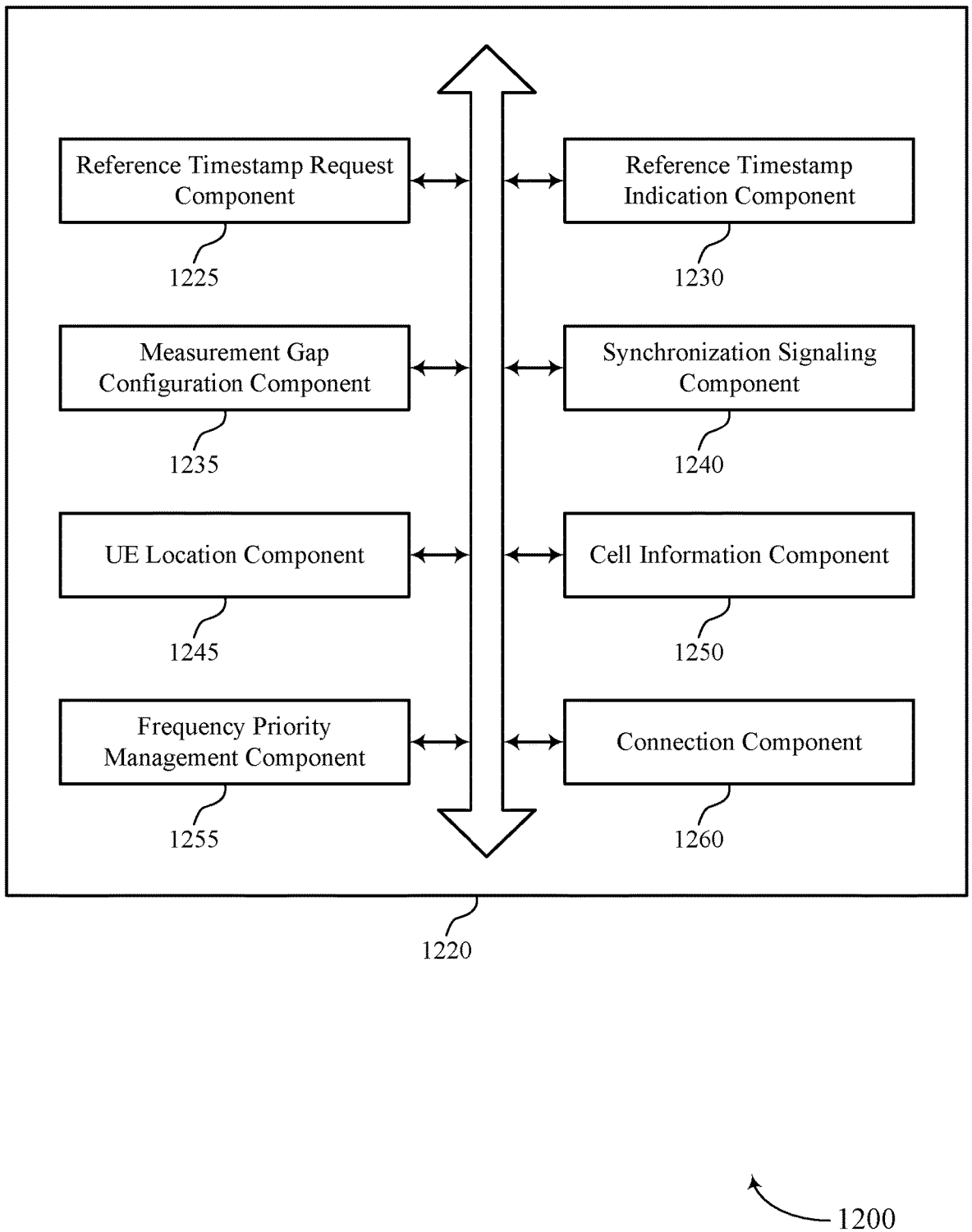
FIG. 12 shows a block diagram of a communications manager that supports UE mobility between an NTN and a TN in accordance with one or more aspects of the present disclosure.

FIG. 12 shows a block diagram 1200 of a communications manager 1220 that supports UE mobility between an NTN and a TN in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of UE mobility between an NTN and a TN as described herein. For example, the communications manager 1220 may include a reference timestamp request component 1225, a reference timestamp indication component 1230, a measurement gap configuration component 1235, a synchronization signaling component 1240, a UE location component 1245, a cell information component 1250, a frequency priority management component 1255, a connection component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a first network entity in accordance with examples as disclosed herein. The reference timestamp request component 1225 may be configured as or otherwise support a means for outputting a first signal including a request for a reference timestamp corresponding to a second network entity, the first network entity being associated with a first cell type and operating via a first carrier frequency and the second network entity being associated with a second cell type and operating via a second carrier frequency. The reference timestamp indication component 1230 may be configured as or otherwise support a means for obtaining a second signal indicating the reference timestamp corresponding to the second network entity based on the request. The measurement gap configuration component 1235 may be configured as or otherwise support a means for outputting a third signal including an indication of the reference timestamp corresponding to the second network entity, the third signal configuring a measurement gap for a UE.

In some examples, the UE location component 1245 may be configured as or otherwise support a means for obtaining a fourth signal indicating first location information for the UE, the third signal being output based on the first location information for the UE and second location information for the second network entity.

In some examples, the cell information component 1250 may be configured as or otherwise support a means for outputting a fourth signal indicating location information and distance thresholds for a set of multiple cells associated with the second cell type, the fourth signal indicating at least a location and a distance threshold of the second network entity.

In some examples, the reference timestamp indication component 1230 may be configured as or otherwise support a means for obtaining an additional signal indicating an additional reference timestamp corresponding to the second network entity according to a periodicity.

In some examples, the first cell type corresponds to a first priority value, and the frequency priority management component 1255 may be configured as or otherwise support a means for outputting a fourth signal including a second priority value for the second carrier frequency associated with the second network entity based on the second carrier frequency corresponding to the second cell type, the second priority value being greater than the first priority value corresponding to the first cell type.

In some examples, the indication of the reference timestamp includes a UTC timestamp, a portion of the UTC timestamp, a GNSS timestamp, a portion of the GNSS timestamp, or a combination thereof. In some examples, the reference timestamp indicates an SFN with a value of zero for the second network entity. In some examples, the first cell type includes an NTN cell type. In some examples, the second cell type includes a TN cell type.

Additionally, or alternatively, the communications manager 1220 may support wireless communications at a second network entity in accordance with examples as disclosed herein. In some examples, the reference timestamp request component 1225 may be configured as or otherwise support a means for obtaining a first signal including a request for a reference timestamp corresponding to the second network entity associated with a second cell type, the request being associated with a first network entity, and the first network entity being associated with a first cell type and operating via a first carrier frequency, the second network entity operating via a second carrier frequency. In some examples, the reference timestamp indication component 1230 may be configured as or otherwise support a means for outputting a second signal indicating the reference timestamp corresponding to the second network entity based on the request. The synchronization signaling component 1240 may be configured as or otherwise support a means for outputting a third signal during a measurement gap, the measurement gap being based on the reference timestamp.

In some examples, the connection component 1260 may be configured as or otherwise support a means for establishing a connection with a UE based on the third signal.

In some examples, the synchronization signaling component 1240 may be configured as or otherwise support a means for outputting an SSB including a second timestamp corresponding to the second network entity.

In some examples, the reference timestamp indication component 1230 may be configured as or otherwise support a means for outputting an additional signal indicating an additional reference timestamp corresponding to the second network entity according to a periodicity.

In some examples, the frequency priority management component 1255 may be configured as or otherwise support a means for outputting a fourth signal including a first priority value for the first carrier frequency corresponding to the first cell type, the first priority value being less than a second priority value corresponding to the second cell type. In some examples, the first cell type includes an NTN cell type. In some examples, the second cell type includes a TN cell type.

Figure 13:
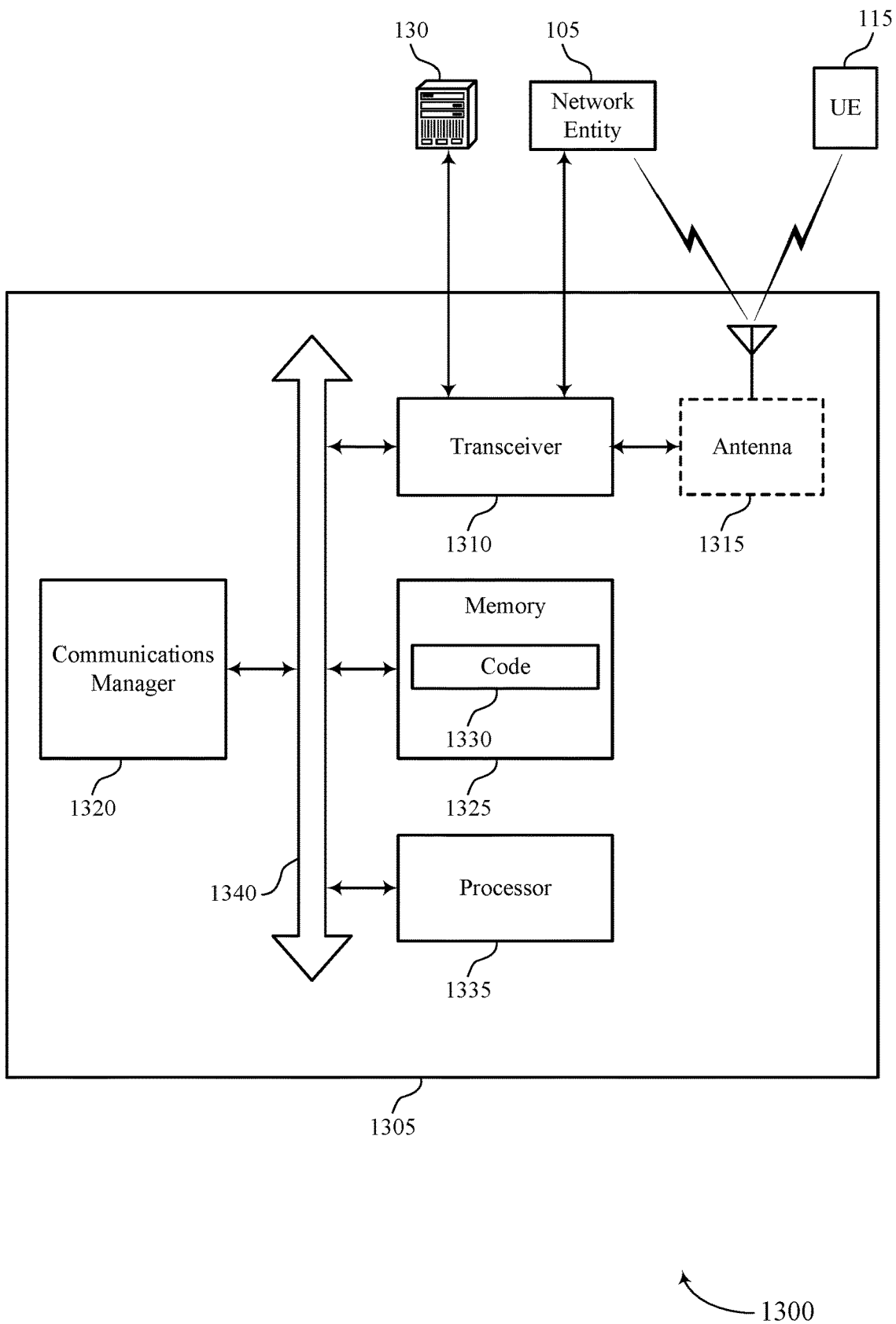
FIG. 13 shows a diagram of a system including a device that supports UE mobility between an NTN and a TN in accordance with one or more aspects of the present disclosure.

FIG. 13 shows a diagram of a system 1300 including a device 1305 that supports UE mobility between an NTN and a TN in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting UE mobility between an NTN and a TN). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a first network entity in accordance with examples as disclosed herein. For example, the communications manager 1320 may be configured as or otherwise support a means for outputting a first signal including a request for a reference timestamp corresponding to a second network entity, the first network entity being associated with a first cell type and operating via a first carrier frequency and the second network entity being associated with a second cell type and operating via a second carrier frequency. The communications manager 1320 may be configured as or otherwise support a means for obtaining a second signal indicating the reference timestamp corresponding to the second network entity based on the request. The communications manager 1320 may be configured as or otherwise support a means for outputting a third signal including an indication of the reference timestamp corresponding to the second network entity, the third signal configuring a measurement gap for a UE.

Additionally, or alternatively, the communications manager 1320 may support wireless communications at a second network entity in accordance with examples as disclosed herein. For example, the communications manager 1320 may be configured as or otherwise support a means for obtaining a first signal including a request for a reference timestamp corresponding to the second network entity associated with a second cell type, the request being associated with a first network entity, and the first network entity being associated with a first cell type and operating via a first carrier frequency, the second network entity operating via a second carrier frequency. The communications manager 1320 may be configured as or otherwise support a means for outputting a second signal indicating the reference timestamp corresponding to the second network entity based on the request. The communications manager 1320 may be configured as or otherwise support a means for outputting a third signal during a measurement gap, the measurement gap being based on the reference timestamp.

By including or configuring the communications manager 1320 in accordance with examples as described herein, the device 1305 may support techniques for improved communication reliability, reduced latency, improved timing coordination between devices for TN cell measurement, or any combination thereof.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of UE mobility between an NTN and a TN as described herein, or the processor 1335 and the memory 1325 may be otherwise configured to perform or support such operations.

Figure 14:
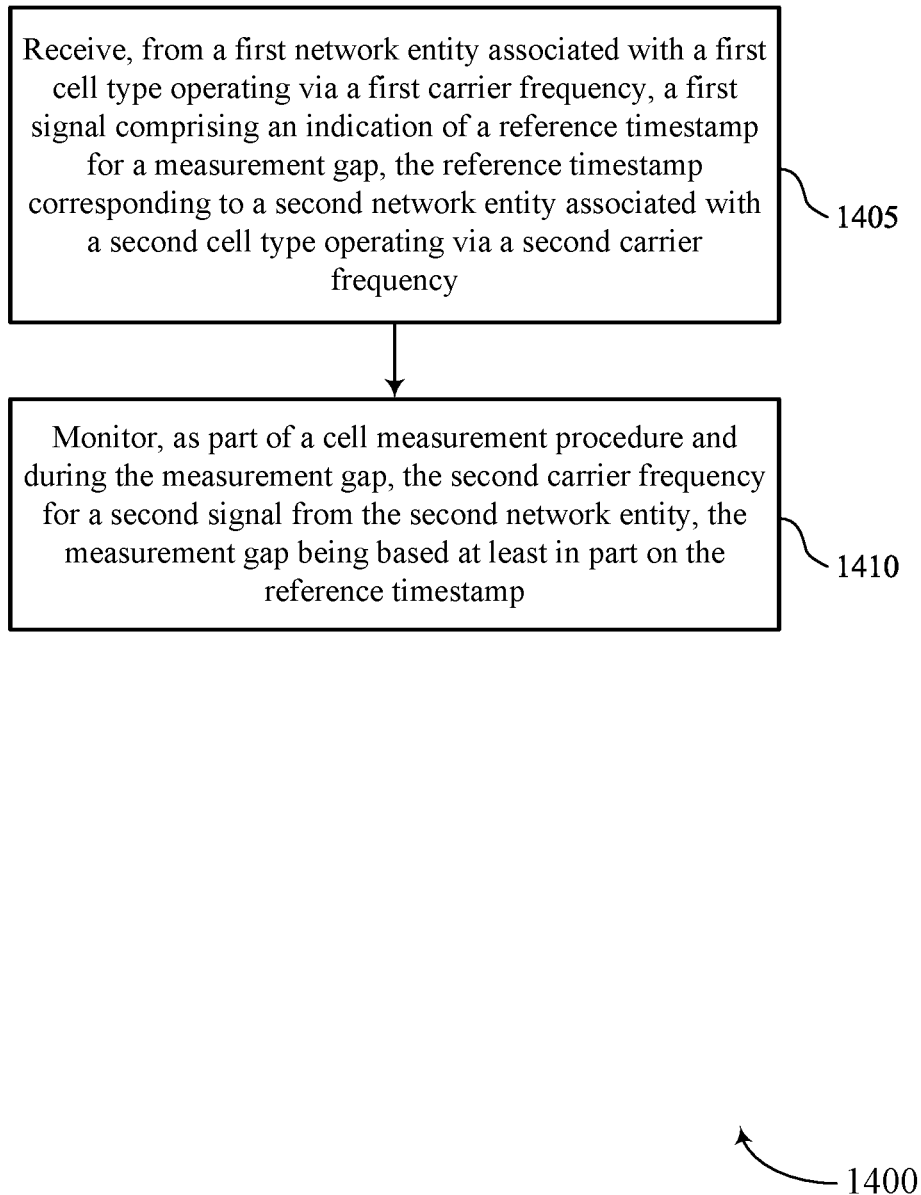
FIGS. 14 through 16 show flowcharts illustrating methods that support UE mobility between an NTN and a TN in accordance with one or more aspects of the present disclosure.

FIG. 14 shows a flowchart illustrating a method 1400 that supports UE mobility between an NTN and a TN in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a first network entity associated with a first cell type and operating via a first carrier frequency, a first signal including an indication of a reference timestamp for a measurement gap, the reference timestamp corresponding to a second network entity associated with a second cell type and operating via a second carrier frequency. The operations of 1405 may be performed in accordance with examples as disclosed herein. In some examples, aspects of the operations of 1405 may be performed by a measurement gap configuration component 825 as described with reference to FIG. 8.

At 1410, the method may include monitoring, as part of a cell measurement procedure and during the measurement gap, the second carrier frequency for a second signal from the second network entity, the measurement gap being based on the reference timestamp. The operations of 1410 may be performed in accordance with examples as disclosed herein. In some examples, aspects of the operations of 1410 may be performed by a cell measurement component 830 as described with reference to FIG. 8.

Figure 15:
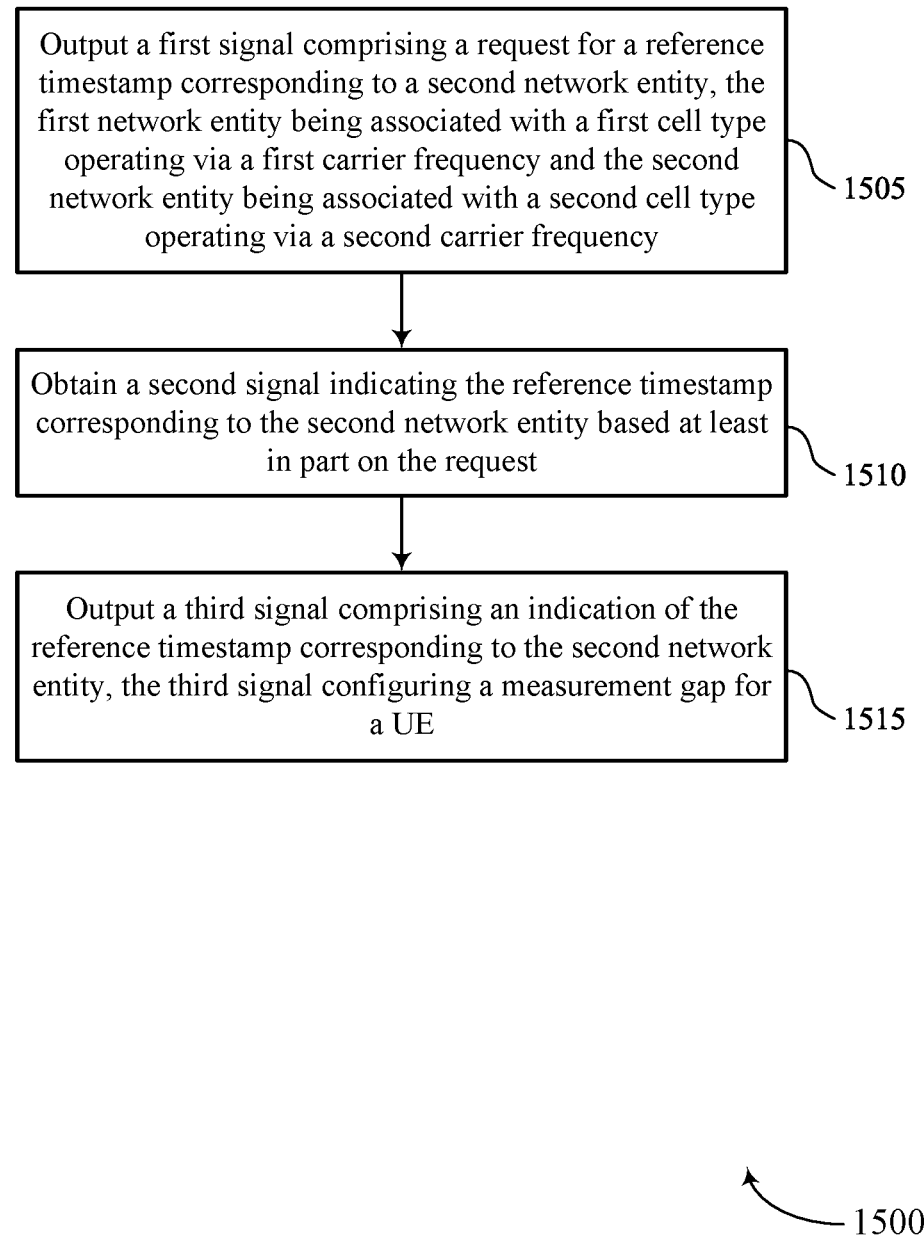

FIG. 15 shows a flowchart illustrating a method 1500 that supports UE mobility between an NTN and a TN in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include outputting a first signal including a request for a reference timestamp corresponding to a second network entity, the first network entity being associated with a first cell type and operating via a first carrier frequency and the second network entity being associated with a second cell type and operating via a second carrier frequency. The operations of 1505 may be performed in accordance with examples as disclosed herein. In some examples, aspects of the operations of 1505 may be performed by a reference timestamp request component 1225 as described with reference to FIG. 12.

At 1510, the method may include obtaining a second signal indicating the reference timestamp corresponding to the second network entity based on the request. The operations of 1510 may be performed in accordance with examples as disclosed herein. In some examples, aspects of the operations of 1510 may be performed by a reference timestamp indication component 1230 as described with reference to FIG. 12.

At 1515, the method may include outputting a third signal including an indication of the reference timestamp corresponding to the second network entity, the third signal configuring a measurement gap for a UE. The operations of 1515 may be performed in accordance with examples as disclosed herein. In some examples, aspects of the operations of 1515 may be performed by a measurement gap configuration component 1235 as described with reference to FIG. 12.

Figure 16:
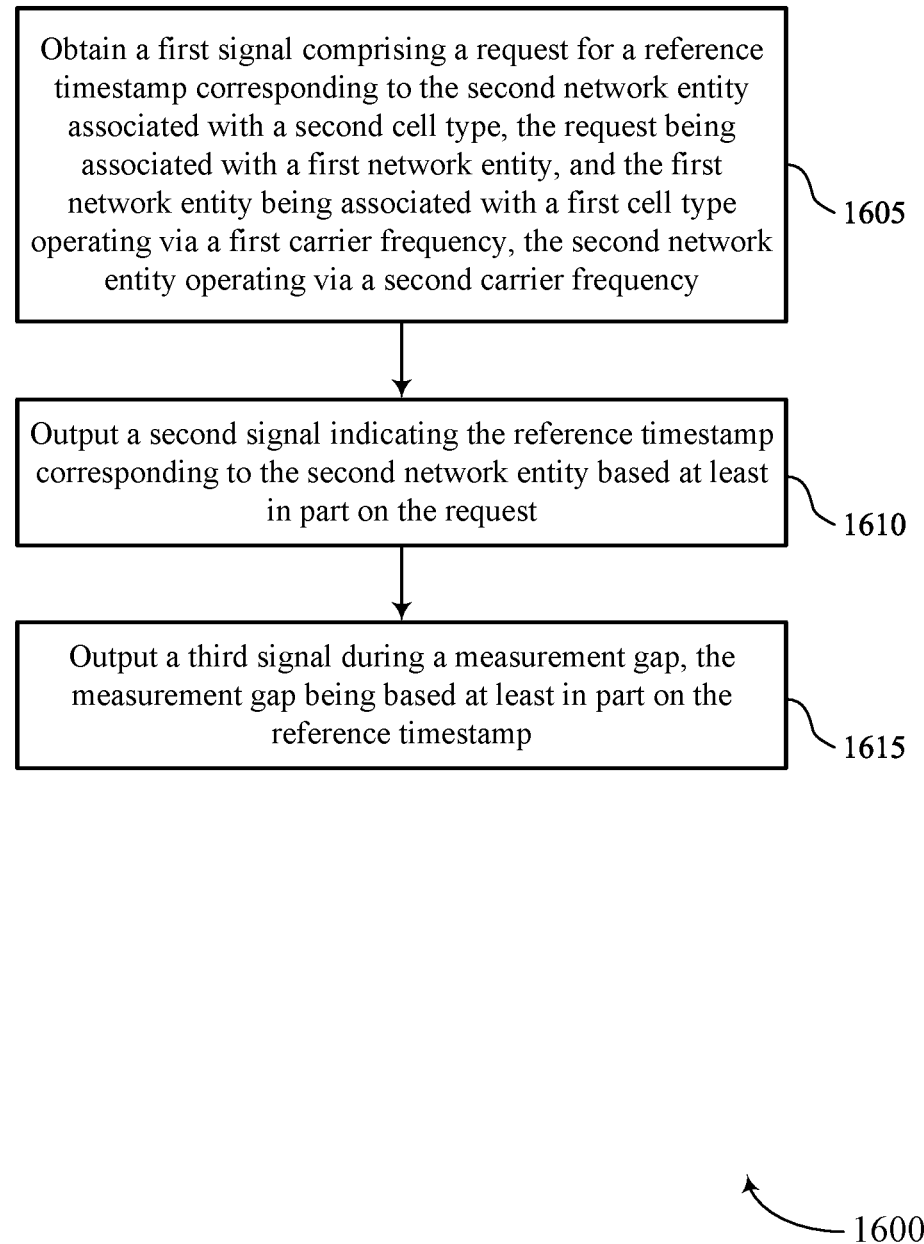

FIG. 16 shows a flowchart illustrating a method 1600 that supports UE mobility between an NTN and a TN in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include obtaining a first signal including a request for a reference timestamp corresponding to the second network entity associated with a second cell type, the request being associated with a first network entity, and the first network entity being associated with a first cell type and operating via a first carrier frequency, the second network entity operating via a second carrier frequency. The operations of 1605 may be performed in accordance with examples as disclosed herein. In some examples, aspects of the operations of 1605 may be performed by a reference timestamp request component 1225 as described with reference to FIG. 12.

At 1610, the method may include outputting a second signal indicating the reference timestamp corresponding to the second network entity based on the request. The operations of 1610 may be performed in accordance with examples as disclosed herein. In some examples, aspects of the operations of 1610 may be performed by a reference timestamp indication component 1230 as described with reference to FIG. 12.

At 1615, the method may include outputting a third signal during a measurement gap, the measurement gap being based on the reference timestamp. The operations of 1615 may be performed in accordance with examples as disclosed herein. In some examples, aspects of the operations of 1615 may be performed by a synchronization signaling component 1240 as described with reference to FIG. 12.

The following provides an overview of aspects of the present disclosure:

Aspect 1: A method for wireless communications at a UE, comprising: receiving, from a first network entity associated with a first cell type operating via a first carrier frequency, a first signal comprising an indication of a reference timestamp for a measurement gap, the reference timestamp corresponding to a second network entity associated with a second cell type operating via a second carrier frequency; and monitoring, as part of a cell measurement procedure and during the measurement gap, the second carrier frequency for a second signal from the second network entity, the measurement gap being based at least in part on the reference timestamp.

Aspect 2: The method of aspect 1, further comprising: receiving, from the second network entity, the second signal based at least in part on the monitored second carrier frequency; and switching a connection from the first network entity to the second network entity based at least in part on one or more measurements of the second signal.

Aspect 3: The method of aspect 2, wherein the cell measurement procedure comprises a first cell measurement procedure, and the method further comprises: receiving, from the second network entity, a third signal comprising a first priority value for the first carrier frequency that corresponds to the first cell type, the first priority value being less than a second priority value corresponding to the second cell type; and refraining from a second cell measurement procedure for the first carrier frequency based at least in part on the first priority value.

Aspect 4: The method of aspect 2, further comprising: refraining from a second cell measurement procedure for the first carrier frequency based at least in part on a first priority value for the first carrier frequency, the first priority value based at least in part on the first carrier frequency corresponding to the first cell type, the first priority value being less than a second priority value corresponding to the second cell type.

Aspect 5: The method of any of aspects 1 through 4, wherein the first cell type corresponds to a first priority value, and the method further comprises: receiving, from the first network entity, a third signal comprising a second priority value for the second carrier frequency based at least in part on the second carrier frequency corresponding to the second cell type, the second priority value being greater than the first priority value corresponding to the first cell type, the monitoring of the second carrier frequency being based at least in part on the second priority value.

Aspect 6: The method of aspect 5, further comprising: operating based at least in part on a connected mode mobility, the second priority value for the second carrier frequency associated with a configuration for the connected mode mobility.

Aspect 7: The method of any of aspects 1 through 4, wherein the first cell type corresponds to a first priority value, and the monitoring the second carrier frequency further comprising: monitoring the second carrier frequency based at least in part on a second priority value for the second carrier frequency, the second priority value based at least in part on the second carrier frequency corresponding to the second cell type, the second priority value being greater than the first priority value corresponding to the first cell type.

Aspect 8: The method of any of aspects 1 through 7, further comprising: receiving, from the second network entity, an SSB comprising a second timestamp corresponding to the second network entity; and monitoring, as part of a second cell measurement procedure, for a third signal from the second network entity during the measurement gap based at least in part on the second timestamp.

Aspect 9: The method of any of aspects 1 through 8, further comprising: transmitting, to the first network entity, a third signal indicating location information for the UE, the first signal indicating the reference timestamp corresponding to the second network entity based at least in part on the location information for the UE.

Aspect 10: The method of any of aspects 1 through 9, wherein the reference timestamp comprises a UTC timestamp, a portion of the UTC timestamp, a GNSS timestamp, a portion of the GNSS timestamp, or a combination thereof.

Aspect 11: The method of any of aspects 1 through 10, wherein the reference timestamp indicates an SFN with a value of zero for the second network entity.

Aspect 12: The method of any of aspects 1 through 11, wherein the first signal further indicates an offset in a time domain for the measurement gap, a periodicity for the measurement gap, a duration for the measurement gap, or a combination thereof, the monitoring the second carrier frequency being further based at least in part on the offset, the periodicity, the duration, or a combination thereof.

Aspect 13: The method of any of aspects 1 through 12, further comprising: transmitting, to the first network entity, a third signal indicating a slot-level offset for the measurement gap based at least in part on the measurement gap that is based at least in part on the reference timestamp corresponding to the second network entity crossing a downlink slot boundary of the first network entity.

Aspect 14: The method of any of aspects 1 through 13, further comprising: receiving, from the first network entity, a third signal indicating location information and distance thresholds for a plurality of cells associated with the second cell type, the third signal indicating at least a respective location and a respective distance threshold of the second network entity; and monitoring for the second signal from the second network entity based at least in part on the UE being within the respective distance threshold of the respective location of the second network entity.

Aspect 15: The method of any of aspects 1 through 14, wherein the first cell type comprises a non-terrestrial network (NTN) cell type; and the second cell type comprises a terrestrial network (TN) cell type.

Aspect 16: A method for wireless communications at a first network entity, comprising: outputting a first signal comprising a request for a reference timestamp corresponding to a second network entity, the first network entity being associated with a first cell type operating via a first carrier frequency, and the second network entity being associated with a second cell type operating via a second carrier frequency; obtaining a second signal indicating the reference timestamp corresponding to the second network entity based at least in part on the request; and outputting a third signal indicating the reference timestamp corresponding to the second network entity, the third signal configuring a measurement gap for a UE.

Aspect 17: The method of aspect 16, further comprising: obtaining a fourth signal indicating first location information for the UE, the third signal received based at least in part on the first location information for the UE and second location information for the second network entity.

Aspect 18: The method of any of aspects 16 through 17, further comprising: outputting a fourth signal indicating location information and distance thresholds for a plurality of cells associated with the second cell type, the fourth signal indicating at least a location and a distance threshold of the second network entity.

Aspect 19: The method of any of aspects 16 through 18, further comprising: obtaining an additional signal indicating an additional reference timestamp corresponding to the second network entity based at least in part on a periodicity.

Aspect 20: The method of any of aspects 16 through 19, wherein the first cell type corresponds to a first priority value, and the method further comprises: outputting a fourth signal comprising a second priority value for the second carrier frequency associated with the second network entity based at least in part on the second carrier frequency corresponding to the second cell type, the second priority value being greater than the first priority value corresponding to the first cell type.

Aspect 21: The method of any of aspects 16 through 20, wherein the reference timestamp comprises a UTC timestamp, a portion of the UTC timestamp, a GNSS timestamp, a portion of the GNSS timestamp, or a combination thereof.

Aspect 22: The method of any of aspects 16 through 21, wherein the reference timestamp indicates an SFN with a value of zero for the second network entity.

Aspect 23: The method of any of aspects 16 through 22, wherein the first cell type comprises an NTN cell type; and the second cell type comprises a TN cell type.

Aspect 24: A method for wireless communications at a second network entity, comprising: obtaining a first signal comprising a request for a reference timestamp corresponding to the second network entity, the request being associated with a first network entity, the first network entity being associated with a first cell type operating via a first carrier frequency, and the second network entity being associated with a second cell type operating via a second carrier frequency; outputting a second signal indicating the reference timestamp corresponding to the second network entity based at least in part on the request; and outputting a third signal during a measurement gap, the measurement gap being based at least in part on the reference timestamp.

Aspect 25: The method of aspect 24, further comprising: establishing a connection with a UE based at least in part on the third signal.

Aspect 26: The method of any of aspects 24 through 25, further comprising: outputting an SSB comprising a second timestamp corresponding to the second network entity.

Aspect 27: The method of any of aspects 24 through 26, further comprising: outputting an additional signal indicating an additional reference timestamp corresponding to the second network entity based at least in part on a periodicity.

Aspect 28: The method of any of aspects 24 through 27, further comprising: outputting a fourth signal comprising a first priority value for the first carrier frequency corresponding to the first cell type, the first priority value being less than a second priority value corresponding to the second cell type.

Aspect 29: The method of any of aspects 24 through 28, wherein the first cell type comprises an NTN cell type; and the second cell type comprises a TN cell type.

Aspect 30: An apparatus for wireless communications at a UE, comprising: a processor; and memory coupled with the processor, the processor configured to perform a method of any of aspects 1 through 15.

Aspect 31: An apparatus for wireless communications at a UE, comprising at least one means for performing a method of any of aspects 1 through 15.

Aspect 32: A non-transitory computer-readable medium storing code for wireless communications at a UE, the code comprising instructions executable by a processor to perform a method of any of aspects 1 through 15.

Aspect 33: An apparatus for wireless communications at a first network entity, comprising: a processor; and memory coupled with the processor, the processor configured to perform a method of any of aspects 16 through 23.

Aspect 34: An apparatus for wireless communications at a first network entity, comprising at least one means for performing a method of any of aspects 16 through 23.

Aspect 35: A non-transitory computer-readable medium storing code for wireless communications at a first network entity, the code comprising instructions executable by a processor to perform a method of any of aspects 16 through 23.

Aspect 36: An apparatus for wireless communications at a second network entity, comprising: a processor; and memory coupled with the processor, the processor configured to perform a method of any of aspects 24 through 29.

Aspect 37: An apparatus for wireless communications at a second network entity, comprising at least one means for performing a method of any of aspects 24 through 29.

Aspect 38: A non-transitory computer-readable medium storing code for wireless communications at a second network entity, the code comprising instructions executable by a processor to perform a method of any of aspects 24 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one memory; and
   at least one coupled with the at least one memory and configured to cause the UE to:
      receive, from a first network entity associated with a first cell type that operates via a first carrier frequency, a first signal that indicates a reference timestamp for a measurement gap, the reference timestamp corresponding to a second network entity associated with a second cell type that operates via a second carrier frequency; and
      monitor, as part of a cell measurement procedure and during the measurement gap, the second carrier frequency for a second signal from the second network entity, the measurement gap based at least in part on the reference timestamp.

2. The apparatus of claim 1, wherein the at least one processor is further configured to cause the UE to:
   receive, from the second network entity, the second signal based at least in part on the monitored second carrier frequency; and
   switch a connection from the first network entity to the second network entity based at least in part on one or more measurements of the second signal.

3. The apparatus of claim 2, wherein the cell measurement procedure comprises a first cell measurement procedure and the at least one processor is further configured to cause the UE to:
   receive, from the second network entity, a third signal that comprises a first priority value for the first carrier frequency that corresponds to the first cell type, wherein the first priority value is less than a second priority value that corresponds to the second cell type; and
   refrain from a second cell measurement procedure for the first carrier frequency based at least in part on the first priority value.

4. The apparatus of claim 2, wherein the at least one processor is further configured to cause the UE to:
   refrain from a second cell measurement procedure for the first carrier frequency based at least in part on a first priority value for the first carrier frequency, the first priority value based at least in part on the first carrier frequency that corresponds to the first cell type, the first priority value being less than a second priority value that corresponds to the second cell type.

5. The apparatus of claim 1, wherein the first cell type corresponds to a first priority value and the at least one processor is further configured to cause the UE to:
receive, from the first network entity, a third signal that comprises a second priority value for the second carrier frequency based at least in part on the second carrier frequency that corresponds to the second cell type, the second priority value being greater than the first priority value that corresponds to the first cell type, wherein the second carrier frequency is monitored based at least in part on the second priority value.

6. The apparatus of claim 5, wherein the at least one processor is further configured to cause the UE to:
operate based at least in part on a connected mode mobility, the second priority value for the second carrier frequency associated with a configuration for the connected mode mobility.

7. The apparatus of claim 1, wherein the first cell type corresponds to a first priority value and the at least one processor configured to monitor the second carrier frequency is configured to cause the UE to:
monitor the second carrier frequency based at least in part on a second priority value for the second carrier frequency, the second priority value based at least in part on the second carrier frequency that corresponds to the second cell type, wherein the second priority value is greater than the first priority value that corresponds to the first cell type.

8. The apparatus of claim 1, wherein the at least one processor is further configured to cause the UE to:
receive, from the second network entity, a synchronization signal block that comprises a second timestamp that corresponds to the second network entity; and
monitor, as part of a second cell measurement procedure, for a third signal from the second network entity during the measurement gap based at least in part on the second timestamp.

9. The apparatus of claim 1, wherein the at least one processor is further configured to cause the UE to:
transmit, to the first network entity, a third signal that indicates location information for the UE, the first signal that indicates the reference timestamp that corresponds to the second network entity based at least in part on the location information for the UE.

10. The apparatus of claim 1, wherein the reference timestamp comprises a universal time coordinated (UTC) timestamp, a portion of the UTC timestamp, a global navigation satellite system (GNSS) timestamp, a portion of the GNSS timestamp, or a combination thereof.

11. The apparatus of claim 1, wherein the reference timestamp indicates a system frame number (SFN) with a value of zero for the second network entity.

12. The apparatus of claim 1, wherein the first signal further indicates an offset in a time domain for the measurement gap, a periodicity for the measurement gap, a duration for the measurement gap, or a combination thereof, and wherein the second carrier frequency is monitored based at least in part on the offset, the periodicity, the duration, or a combination thereof.

13. The apparatus of claim 1, wherein the at least one processor is further configured to cause the UE to:
transmit, to the first network entity, a third signal that indicates a slot-level offset for the measurement gap in accordance with the measurement gap that is based at least in part on the reference timestamp that corresponds to the second network entity crossing a downlink slot boundary of the first network entity.

14. The apparatus of claim 1, wherein the at least one processor is further configured to cause the UE to:
receive, from the first network entity, a third signal that indicates location information and distance thresholds for a plurality of cells associated with the second cell type, wherein the third signal indicates at least a respective location and a respective distance threshold of the second network entity; and
monitor for the second signal from the second network entity based at least in part on the UE being within the respective distance threshold of the respective location of the second network entity.

15. The apparatus of claim 1, wherein:
the first cell type comprises a non-terrestrial network (NTN) cell type; and
the second cell type comprises a terrestrial network (TN) cell type.

16. An apparatus for wireless communications at a first network entity, comprising:
at least one memory; and
at least one a processor coupled with the at least one memory and configured to cause the first network entity to:
output a first signal that comprises a request for a reference timestamp that corresponds to a second network entity, the first network entity being associated with a first cell type that operates via a first carrier frequency, and the second network entity being associated with a second cell type that operates via a second carrier frequency;
obtain a second signal that indicates the reference timestamp that corresponds to the second network entity based at least in part on the request; and
output a third signal that indicates the reference timestamp that corresponds to the second network entity and that configures a measurement gap for a user equipment (UE).

17. The apparatus of claim 16, wherein the at least one processor is further configured to cause the first network entity to:
obtain a fourth signal that indicates first location information for the UE, the third signal based at least in part on the first location information for the UE and second location information for the second network entity.

18. The apparatus of claim 16, wherein the at least one processor is further configured to cause the first network entity to:
output a fourth signal that indicates location information and distance thresholds for a plurality of cells associated with the second cell type, wherein the fourth signal indicates at least a location and a distance threshold of the second network entity.

19. The apparatus of claim 16, wherein the at least one processor is further configured to cause the first network entity to:
obtain an additional signal that indicates an additional reference timestamp that corresponds to the second network entity based at least in part on a periodicity.

20. The apparatus of claim 16, wherein the first cell type corresponds to a first priority value and the at least one processor is further configured to cause the first network entity to:
output a fourth signal that comprises a second priority value for the second carrier frequency associated with the second network entity based at least in part on the second carrier frequency that corresponds to the second cell type, wherein the second priority value is greater than the first priority value that corresponds to the first cell type.

21. The apparatus of claim 16, wherein the reference timestamp comprises a universal time coordinated (UTC) timestamp, a portion of the UTC timestamp, a global navigation satellite system (GNSS) timestamp, a portion of the GNSS timestamp, or a combination thereof.

22. The apparatus of claim 16, wherein the reference timestamp indicates a system frame number (SFN) with a value of zero for the second network entity.

23. The apparatus of claim 16, wherein:
the first cell type comprises a non-terrestrial network (NTN) cell type; and
the second cell type comprises a terrestrial network (TN) cell type.

24. An apparatus for wireless communications at a second network entity, comprising:
at least one memory; and
at least one processor coupled with the at least one memory and configured to cause the second network entity to:
obtain a first signal that comprises a request for a reference timestamp that corresponds to the second network entity, the request associated with a first network entity, the first network entity associated with a first cell type that operates via a first carrier frequency, and the second network entity associated with a second cell type that operates via a second carrier frequency;
output a second signal that indicates the reference timestamp that corresponds to the second network entity based at least in part on the request; and
output a third signal during a measurement gap, the measurement gap based at least in part on the reference timestamp.

25. The apparatus of claim 24, wherein the at least one processor is further configured to cause the second network entity to:
establish a connection with a user equipment (UE) based at least in part on the third signal.

26. The apparatus of claim 24, wherein the at least one processor is further configured to cause the second network entity to:
output a synchronization signal block that comprises a second timestamp that corresponds to the second network entity.

27. The apparatus of claim 24, wherein the at least one processor is further configured to cause the second network entity to:
output an additional signal that indicates an additional reference timestamp that corresponds to the second network entity based at least in part on a periodicity.

28. The apparatus of claim 24, wherein the at least one processor is further configured to cause the second network entity to:
output a fourth signal that comprises a first priority value for the first carrier frequency that corresponds to the first cell type, wherein the first priority value is less than a second priority value that corresponds to the second cell type.

29. The apparatus of claim 24, wherein:
the first cell type comprises a non-terrestrial network (NTN) cell type; and
the second cell type comprises a terrestrial network (TN) cell type.

30. A method for wireless communications at a user equipment (UE), comprising:
receiving, from a first network entity associated with a first cell type operating via a first carrier frequency, a first signal comprising an indication of a reference timestamp for a measurement gap, the reference timestamp corresponding to a second network entity associated with a second cell type operating via a second carrier frequency; and
monitoring, as part of a cell measurement procedure and during the measurement gap, the second carrier frequency for a second signal from the second network entity, the measurement gap being based at least in part on the reference timestamp.

31. The method of claim 30, further comprising:
receiving, from the second network entity, the second signal based at least in part on the monitored second carrier frequency; and
switching a connection from the first network entity to the second network entity based at least in part on one or more measurements of the second signal.

32. A method for wireless communications at a first network entity, comprising:
outputting a first signal that comprises a request for a reference timestamp that corresponds to a second network entity, the first network entity being associated with a first cell type that operates via a first carrier frequency, and the second network entity being associated with a second cell type that operates via a second carrier frequency;
obtaining a second signal that indicates the reference timestamp that corresponds to the second network entity based at least in part on the request; and
outputting a third signal that indicates the reference timestamp that corresponds to the second network entity and that configures a measurement gap for a user equipment (UE).

33. The method of claim 32, further comprising:
obtaining a fourth signal that indicates first location information for the UE, the third signal based at least in part on the first location information for the UE and second location information for the second network entity.

34. A method for wireless communications at a second network entity, comprising:
obtaining a first signal that comprises a request for a reference timestamp that corresponds to the second network entity, the request associated with a first network entity, the first network entity associated with a first cell type that operates via a first carrier frequency, and the second network entity associated with a second cell type that operates via a second carrier frequency;
outputting a second signal that indicates the reference timestamp that corresponds to the second network entity based at least in part on the request; and
outputting a third signal during a measurement gap, the measurement gap based at least in part on the reference timestamp.

35. The method of claim 34, further comprising:
establishing a connection with a user equipment (UE) based at least in part on the third signal.

* * * * *